(12) United States Patent
Brambilla et al.

(10) Patent No.: US 11,848,449 B2
(45) Date of Patent: *Dec. 19, 2023

(54) ELECTRODES FOR ENERGY STORAGE DEVICES

(71) Applicant: FastCAP Systems Corporation, Boston, MA (US)

(72) Inventors: Nicolo Brambilla, Brookline, MA (US); Jin Yan, Boston, MA (US); Ki T. Park, Chestnut Hill, MA (US); Ting Du, Quincy, MA (US); Xujie Chen, Quincy, MA (US); Wanjun Ben Cao, Boston, MA (US)

(73) Assignee: FASTCAP SYSTEMS CORPORATION, Wakefield, MA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/316,037

(22) Filed: May 10, 2021

(65) Prior Publication Data

US 2021/0265634 A1    Aug. 26, 2021

Related U.S. Application Data

(63) Continuation of application No. 17/114,153, filed on Dec. 7, 2020, now Pat. No. 11,557,765, which is a
(Continued)

(51) Int. Cl.
*H01M 4/62*    (2006.01)
*H01M 4/505*    (2010.01)
(Continued)

(52) U.S. Cl.
CPC .......... *H01M 4/621* (2013.01); *C01B 32/174* (2017.08); *C08K 3/041* (2017.05); *H01M 4/131* (2013.01);
(Continued)

(58) Field of Classification Search
CPC .... H01M 4/625; H01M 4/0471; H01M 4/525; H01M 10/0525; H01M 4/0404;
(Continued)

(56) References Cited

U.S. PATENT DOCUMENTS 3,982,182 A    9/1976    Hogg
4,349,910 A    9/1982    Belz
(Continued)

FOREIGN PATENT DOCUMENTS

CN    101027736 A    8/2007
CN    101794671 A    8/2010
(Continued)

OTHER PUBLICATIONS

Li et al., High-voltage positive electrode materials for lithium-ion batteries, Chem. Soc. Rev., 2017, 46, 3006-3059.*
(Continued)

*Primary Examiner* — Zhongqing Wei

(57) ABSTRACT

An electrode active layer is disclosed that includes a network of high aspect ratio carbon elements (e.g., carbon nanotubes, carbon nanotube bundles, graphene flakes, or the like) that provides a highly electrically conductive scaffold that entangles or enmeshes the active material, thereby supporting the layer. A surface treatment can be applied to the high aspect ratio carbon elements to promote adhesion to the active material and any underlying electrode layers improving the overall cohesion and mechanical stability of the active layer. This surface treatment forms only a thin (in some cases even monomolecular) layer on the network, leaving the large void spaces that are free of any bulk binder material and so may instead be filled with active material. The resulting active layer may be formed with excellent mechanical stability even at large thickness and high active material mass loading.

26 Claims, 9 Drawing Sheets

Related U.S. Application Data continuation of application No. PCT/US2020/040943, filed on Jul. 6, 2020.

(60) Provisional application No. 63/041,801, filed on Jun. 19, 2020, provisional application No. 63/003,341, filed on Apr. 1, 2020, provisional application No. 62/954,771, filed on Dec. 30, 2019, provisional application No. 62/876,124, filed on Jul. 19, 2019, provisional application No. 62/871,041, filed on Jul. 5, 2019.

(51) Int. Cl.
| | |
|---|---|
| *H01M 4/131* | (2010.01) |
| *H01M 4/36* | (2006.01) |
| *H01M 4/525* | (2010.01) |
| *H01M 10/0525* | (2010.01) |
| *C08K 3/04* | (2006.01) |
| *C01B 32/174* | (2017.01) |
| *H01M 4/485* | (2010.01) |
| *H01G 11/36* | (2013.01) |
| *H01G 11/46* | (2013.01) |
| *H01G 11/50* | (2013.01) |
| *H01M 4/02* | (2006.01) |

(52) U.S. Cl.
CPC ........... *H01M 4/366* (2013.01); *H01M 4/485* (2013.01); *H01M 4/505* (2013.01); *H01M 4/525* (2013.01); *H01M 4/622* (2013.01); *H01M 4/625* (2013.01); *H01M 10/0525* (2013.01); *H01G 11/36* (2013.01); *H01G 11/46* (2013.01); *H01G 11/50* (2013.01); *H01M 2004/021* (2013.01)

(58) Field of Classification Search
CPC .... H01M 4/505; H01M 4/0435; H01M 4/131; H01M 4/621; H01M 2004/021; H01M 4/02; H01M 4/0416; H01M 4/043; H01M 4/133; H01M 4/1391; H01M 4/366; H01M 4/48; H01M 4/485; H01M 4/5825; H01M 4/583; H01M 4/587; H01M 4/622; H01M 4/64; H01M 10/052; H01M 10/425; H01M 2010/4271; H01M 2220/20; H01M 4/049; H01M 4/13; H01M 4/134; H01M 4/1395; H01M 4/362; H01M 4/364; H01M 4/386; H01M 4/661

See application file for complete search history.

(56) References Cited

U.S. PATENT DOCUMENTS

| | | |
|---|---|---|
| 4,408,259 A | 10/1983 | Muranaka et al. |
| 4,934,366 A | 6/1990 | Truex et al. |
| 5,426,561 A | 6/1995 | Yen et al. |
| 5,440,447 A | 8/1995 | Shipman et al. |
| 5,441,827 A | 8/1995 | Gratzel et al. |
| 5,476,709 A | 12/1995 | Inoue et al. |
| 5,711,988 A | 1/1998 | Tsai et al. |
| 5,905,629 A | 5/1999 | Alford |
| 5,923,619 A | 7/1999 | Knapen et al. |
| 6,059,847 A | 5/2000 | Farahmandi et al. |
| 6,060,424 A | 5/2000 | Alford |
| 6,193,779 B1 | 2/2001 | Reichert et al. |
| 6,205,016 B1 | 3/2001 | Niu |
| 6,232,706 B1 | 5/2001 | Dai et al. |
| 6,257,332 B1 | 7/2001 | Mdrine et al. |
| 6,304,427 B1 | 10/2001 | Reed et al. |
| 6,318,457 B1 | 11/2001 | Den Boer et al. |
| 6,346,187 B1 | 2/2002 | Tran et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,511,760 B1 | 1/2003 | Barone et al. |
| 6,514,113 B1 | 2/2003 | Lee et al. |
| 6,565,701 B1 | 5/2003 | Jerabek et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,914,341 B1 | 7/2005 | McIntyre |
| 6,924,059 B1 | 8/2005 | Kawakami et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,327,556 B2 | 2/2008 | Ro et al. |
| 7,335,395 B2 | 2/2008 | Ward et al. |
| 7,381,367 B1 | 6/2008 | Baker et al. |
| 7,468,679 B2 | 12/2008 | Feluch |
| 7,493,962 B2 | 2/2009 | Sheffield |
| 7,511,941 B1 | 3/2009 | Gallay et al. |
| 7,532,454 B2 | 5/2009 | Plee et al. |
| 7,699,102 B2 | 4/2010 | Storm et al. |
| 7,713,658 B2 | 5/2010 | Mizuta et al. |
| 7,767,114 B2 | 8/2010 | Gordon et al. |
| 7,785,558 B2 | 8/2010 | Hikata |
| 7,854,991 B2 | 12/2010 | Hata et al. |
| 7,897,209 B2 | 3/2011 | Shibuya et al. |
| 7,914,927 B2 | 3/2011 | Mizuta et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,119,032 B2 | 2/2012 | Gordon et al. |
| 8,168,331 B2 | 5/2012 | Best et al. |
| 8,481,158 B2 | 7/2013 | Nakayama et al. |
| 8,531,818 B2 | 9/2013 | Hashimoto et al. |
| 8,709,374 B2 | 4/2014 | Cooper et al. |
| 8,760,851 B2 | 6/2014 | Signorelli et al. |
| 8,817,452 B2 | 8/2014 | Nguyen et al. |
| 8,822,057 B2 | 9/2014 | Sinsabaugh et al. |
| 8,932,750 B2 | 1/2015 | Cooley et al. |
| 9,001,495 B2 | 4/2015 | Martini et al. |
| 9,013,144 B2 | 4/2015 | Cooley et al. |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley et al. |
| 9,218,917 B2 | 12/2015 | Brambilla et al. |
| 9,455,094 B2 | 9/2016 | Tour et al. |
| 9,515,499 B2 | 12/2016 | Signorelli et al. |
| 9,558,894 B2 | 1/2017 | Signorelli et al. |
| 9,673,448 B2 | 6/2017 | Yushin et al. |
| 9,683,441 B2 | 6/2017 | Signorelli et al. |
| 9,954,382 B2 | 4/2018 | Cooley et al. |
| 10,340,520 B2 | 7/2019 | Yushin et al. |
| 10,600,582 B1 | 3/2020 | Brambilla et al. |
| 2001/0006108 A1 | 7/2001 | Brett |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi et al. |
| 2003/0081372 A1 | 5/2003 | Nakazawa et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2005/0152096 A1 | 7/2005 | Farahmandi et al. |
| 2005/0208207 A1 | 9/2005 | Hinoki et al. |
| 2005/0230270 A1 | 10/2005 | Ren et al. |
| 2005/0231893 A1 | 10/2005 | Harvey |
| 2005/0234177 A1 | 10/2005 | Zaghib et al. |
| 2005/0238810 A1 | 10/2005 | Scaringe et al. |

(56) References Cited

U.S. PATENT DOCUMENTS

| | | |
|---|---|---|
| 2005/0250052 A1 | 11/2005 | Nguyen |
| 2006/0019168 A1 | 1/2006 | Li et al. |
| 2006/0115722 A1 | 6/2006 | Kim |
| 2006/0191681 A1 | 8/2006 | Storm et al. |
| 2006/0194102 A1 | 8/2006 | Keshishian et al. |
| 2006/0241236 A1 | 10/2006 | Kuznetsov et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0292746 A1 | 12/2007 | Sloop |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0192407 A1 | 8/2008 | Lu et al. |
| 2008/0218945 A1 | 9/2008 | Ro et al. |
| 2008/0304207 A1 | 12/2008 | Brandon et al. |
| 2008/0316678 A1 | 12/2008 | Ehrenberg et al. |
| 2008/0317660 A1 | 12/2008 | Pan et al. |
| 2009/0011330 A1 | 1/2009 | Onodera et al. |
| 2009/0021890 A1 | 1/2009 | Bourcier et al. |
| 2009/0122469 A1 | 5/2009 | Hatori et al. |
| 2009/0154060 A1 | 6/2009 | Anderson et al. |
| 2009/0194314 A1 | 8/2009 | Varkey et al. |
| 2009/0246625 A1 | 10/2009 | Lu |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0294753 A1 | 12/2009 | Hauge et al. |
| 2009/0303658 A1 | 12/2009 | Hiroyuki et al. |
| 2010/0039749 A1 | 2/2010 | Ritter et al. |
| 2010/0046142 A1 | 2/2010 | Aitchison et al. |
| 2010/0062229 A1 | 3/2010 | Hata et al. |
| 2010/0119934 A1 | 5/2010 | Ushio et al. |
| 2010/0134955 A1 | 6/2010 | O'Connor et al. |
| 2010/0178543 A1 | 7/2010 | Gruner et al. |
| 2010/0178564 A1 | 7/2010 | Asari et al. |
| 2010/0178568 A1 | 7/2010 | Unalan et al. |
| 2010/0195269 A1 | 8/2010 | Kim et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2010/0282496 A1 | 11/2010 | Landi et al. |
| 2011/0013344 A1 | 1/2011 | Remizov et al. |
| 2011/0027537 A1 | 2/2011 | Inoue et al. |
| 2011/0049901 A1 | 3/2011 | Tinnen et al. |
| 2011/0080689 A1 | 4/2011 | Bielawski et al. |
| 2011/0085285 A1 | 4/2011 | Zednicek et al. |
| 2011/0091767 A1 | 4/2011 | Hojo et al. |
| 2011/0102002 A1 | 5/2011 | Riehl et al. |
| 2011/0111279 A1* | 5/2011 | Smithyman ......... H01M 8/0243 428/221 |
| 2011/0133284 A1 | 6/2011 | Mitra et al. |
| 2011/0141661 A1 | 6/2011 | Muthu et al. |
| 2011/0143197 A1 | 6/2011 | Ohtsuka et al. |
| 2011/0150736 A1 | 6/2011 | Hagiwara et al. |
| 2011/0151317 A1 | 6/2011 | Giroud et al. |
| 2011/0157773 A1 | 6/2011 | Sasaki |
| 2011/0170236 A1 | 7/2011 | Young |
| 2011/0170237 A1 | 7/2011 | Brandon et al. |
| 2011/0171371 A1 | 7/2011 | Li et al. |
| 2011/0183206 A1 | 7/2011 | Davis et al. |
| 2011/0220191 A1 | 9/2011 | Flood |
| 2011/0255212 A1 | 10/2011 | Liu et al. |
| 2011/0256454 A1 | 10/2011 | Nicolas et al. |
| 2011/0262772 A1 | 10/2011 | Hauge et al. |
| 2011/0281156 A1 | 11/2011 | Boren et al. |
| 2011/0293850 A1 | 12/2011 | Yi et al. |
| 2012/0021291 A1 | 1/2012 | Ji et al. |
| 2012/0094181 A1 | 4/2012 | Kim et al. |
| 2012/0099244 A1 | 4/2012 | Lee et al. |
| 2012/0122020 A1 | 5/2012 | Hata et al. |
| 2012/0154979 A1 | 6/2012 | Signorelli et al. |
| 2012/0231270 A1 | 9/2012 | Dhinojwala et al. |
| 2012/0251432 A1 | 10/2012 | Cooper et al. |
| 2012/0257326 A1 | 10/2012 | Gadkaree et al. |
| 2012/0313586 A1 | 12/2012 | Signorelli et al. |
| 2012/0313591 A1 | 12/2012 | Brambilla et al. |
| 2013/0004657 A1 | 1/2013 | Xu et al. |
| 2013/0005941 A1 | 1/2013 | Kondou et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044405 A1 | 2/2013 | Brambilla et al. |
| 2013/0045157 A1 | 2/2013 | Brambilla et al. |
| 2013/0141840 A1 | 6/2013 | Cooley et al. |
| 2013/0177812 A1 | 7/2013 | Han et al. |
| 2013/0189580 A1 | 7/2013 | Dai et al. |
| 2013/0222975 A1 | 8/2013 | Yan et al. |
| 2014/0016246 A1 | 1/2014 | Gadkaree et al. |
| 2014/0029161 A1 | 1/2014 | Beidaghi et al. |
| 2014/0042988 A1 | 2/2014 | Kuttipillai |
| 2014/0057164 A1 | 2/2014 | Brambilla et al. |
| 2014/0104754 A1 | 4/2014 | Lipka et al. |
| 2014/0106257 A1 | 4/2014 | Raychaudhuri et al. |
| 2014/0126112 A1 | 5/2014 | Nguyen et al. |
| 2014/0186550 A1 | 7/2014 | Cooper et al. |
| 2014/0265565 A1 | 9/2014 | Cooley et al. |
| 2014/0265580 A1 | 9/2014 | Cooley et al. |
| 2014/0299359 A1 | 10/2014 | Mittal et al. |
| 2014/0313636 A1 | 10/2014 | Tour et al. |
| 2014/0332731 A1 | 11/2014 | Ma et al. |
| 2014/0363568 A1 | 12/2014 | Suematsu et al. |
| 2015/0002987 A1 | 1/2015 | Signorelli et al. |
| 2015/0064092 A1 | 3/2015 | Noyes |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0228969 A1* | 8/2015 | Cho ...................... H01M 4/366 429/223 |
| 2015/0279578 A1 | 10/2015 | Martini et al. |
| 2015/0287961 A1 | 10/2015 | Signorelli et al. |
| 2015/0297751 A1* | 10/2015 | Mitchnick ............ A61K 9/1617 424/172.1 |
| 2016/0012979 A1 | 1/2016 | Zheng |
| 2016/0104891 A1 | 4/2016 | Holme |
| 2016/0276111 A1 | 9/2016 | Kawaguchi et al. |
| 2017/0062831 A1 | 3/2017 | Predtechenskiy et al. |
| 2017/0316889 A1 | 11/2017 | Martini et al. |
| 2017/0338059 A1 | 11/2017 | Knopsnyder et al. |
| 2018/0068803 A1 | 3/2018 | Brambilla et al. |
| 2018/0068804 A1 | 3/2018 | Brambilla et al. |
| 2018/0112047 A1 | 4/2018 | Komukai et al. |
| 2018/0135408 A1 | 5/2018 | Cooley et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2018/0342358 A1 | 11/2018 | Brambilla |
| 2019/0058345 A1 | 2/2019 | Cooley et al. |
| 2019/0080854 A9 | 3/2019 | Brambilla |
| 2019/0218894 A9 | 7/2019 | Signorelli et al. |
| 2019/0371534 A1 | 12/2019 | Brambilla et al. |

FOREIGN PATENT DOCUMENTS

| | | |
|---|---|---|
| CN | 102306553 A | 1/2012 |
| CN | 103050294 A | 4/2013 |
| CN | 103891013 A | 6/2014 |
| CN | 103897183 A | 7/2014 |
| CN | 104362290 A | 2/2015 |
| CN | 105551823 A | 5/2016 |
| CN | 108950736 A | 12/2018 |
| EP | 1798743 A1 | 6/2007 |
| EP | 1953852 A1 | 8/2008 |

(56) References Cited

FOREIGN PATENT DOCUMENTS

| | | |
|---|---|---|
| EP | 2056312 A1 | 6/2009 |
| EP | 2081244 A1 | 7/2009 |
| FR | 2989821 A1 | 10/2013 |
| JP | 2003133185 A | 5/2003 |
| JP | 2003234254 A | 8/2003 |
| JP | 2004127737 A | 4/2004 |
| JP | 2005183443 A | 7/2005 |
| JP | 2007005718 A | 1/2007 |
| JP | 2007200979 A | 8/2007 |
| JP | 2009076514 A | 4/2009 |
| JP | 2009158961 A | 7/2009 |
| JP | 2009246306 A | 10/2009 |
| JP | 2010087302 A | 4/2010 |
| JP | 2015229741 A | 12/2015 |
| WO | 9966985 A1 | 12/1999 |
| WO | 0019461 | 4/2000 |
| WO | 0044965 | 8/2000 |
| WO | 2005102924 A1 | 11/2005 |
| WO | 2006011655 A1 | 2/2006 |
| WO | 2008016990 A2 | 2/2008 |
| WO | 2008142913 A1 | 11/2008 |
| WO | 2009125540 A1 | 10/2009 |
| WO | 2009128343 A1 | 10/2009 |
| WO | 2010067509 A1 | 6/2010 |
| WO | 2011117530 A1 | 9/2011 |
| WO | 2012129690 A1 | 10/2012 |
| WO | 2012162500 A2 | 11/2012 |
| WO | 2012170749 A2 | 12/2012 |
| WO | 2014192776 A1 | 12/2014 |
| WO | 2015054432 A1 | 4/2015 |
| WO | 2015102716 A2 | 7/2015 |
| WO | 2015171528 A1 | 11/2015 |
| WO | 2016057983 A2 | 4/2016 |
| WO | 2018102652 A1 | 6/2018 |
| WO | 2019143531 A1 | 7/2019 |

OTHER PUBLICATIONS

Extended European Search Report for EP Application No. 17876365.2; Report dated Jun. 25, 2020 (8 pages).
Foygel et al.; "Theoretical and computational studies of carbon nanotube composites and suspensions: Electrical and thermal conductivity"; Physical Review B 71; Mar. 2005; 8 pages.
International Search Report and Written Opinion for International Application No. PCT/US2020/040943; Interational Filing Date Jul. 6, 2020; Report dated Oct. 1, 2020 (pp. 1-8).
International Search Report and Written Opinion for International Application No. PCT/US2020/040943; International Filing date Jul. 6, 2020; Report dated Oct. 1, 2020; 8 pages.
Li et al.; "Progress in electrolytes for rechargeable Li-based batteries and beyond"; Green Energy & Environment 1; Feb. 2016; 18-42.
Niu, et al., "High Power Electrochemical Capacitors Based On Carbon Nanotube Electrodes," Appl. Phys. Lett., Mar. 17, 1997, pp. 1480-1482, vol. 70, No. 11.
Randstrom, "The influence of air and its components on the cathodic stability of N-butyl-N-methylpyrrolidinium bis(trifluoromethanesulfonyl)imide," Electrochimica Acta, pp. 1837-1842, Aug. 19, 2007, vol. 53.
Robertson, "Realistic applications of CNTs," materials today, Oct. 2004, pp. 46-52, vol. 7, No. 10.
Schneuwly, et al. "Properties of supercapacitors From the state of-the-art to future trends" Proc. PCIM Jun. 6, 2000. 9 pages.
Shamsipur,et al.,"Physical&electroch.prop.of ionic liquids1-ethyl-3-methylimidazolium tetrafluoroborate, 1-butyl-3-methylimidazolium trifluorometh.&1-butyl-1-methylpyrrolidium bis(trifluoromethylsulfonyl)imide," J.Mol.Liq., pp. 43-50, Aug. 24, 2010,vol. 157.
Signorelli, et al., "Carbon Nanotube Enhanced Ultracapacitor", Sep. 2004. 2 pages.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.
Welna et al., Vertically aligned carbon nanotube electrodes for lithium-ion batteries. Journal of Power Sources. Feb. 1, 2011;196(3):1455-60.
Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
[No Author Listed], New high-energy cathode material can significantly increase safety, life of lithium batteries. ECOPRO—Battery Material Division. Apr. 7, 2009. 16 pages.
An, et al., "Electrochemical Properties Of High-Power Supercapacitors Using Single-Walled Carbon Nanotube Electrodes," Adv. Funct. Mater., Oct. 2001, 387-392, vol. 11, No. 5.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, Jan. 2004, vol. 409.
Balducci, et al., "High temperature carbon-carbon supercapacitor using ionic liquid as electrolyte," J. Power Sources, pp. 922-927, Jan. 3, 2007, vol. 165.
Chen et al., The nanocomposites of carbon nanotube with Sb and SnSb0.5 as Li-ion battery anodes. Carbon. 2003;41(5):959-66, Epub Apr. 9, 2003.
Cui et al., Carbon-Silicon Core-Shell Nanowires as High Capacity Electrode for Lithium Ion Batteries. Nano Lett. 2009;9(9):3370-4. Epub Aug. 5, 2009.
Du et al.; "High power density supercapacitor electrodes of carbon nanotube films by electrophoretic deposition"; Nanotechnology; 17; Oct. 2006, pp. 5314-5318.
Emmenegger, et al., "Investigation Of Electrochemical Double-layer {ECOL) Capacitors Electrodes Based On Carbon Nanotubes And Activated Carbon Materials," J. of Power Sources, Apr. 14, 2003, pp. 321-329, vol. 124.
Evanoff et al., Towards Ultrathick Battery Electrodes: Aligned Carbon Nanotube—Enabled Architecture. Advanced Materials. Jan. 24, 2012;24(4):533-7.
Extended European Search Report for EP 12796013.6 dated Mar. 24, 2015 (F0704.70005EP00).
Extended European Search Report for EP 15849206.6 dated Jul. 4, 2018 (F0704.70053EP00).
Extended European Search Report for EP App No. 14885660.2 dated Oct. 5, 2017 (F0704.70044EP00).
Farmer et al., Atomic Layer Deposition on Suspended Single-Walled Carbon Nanotubes via Gas-Phase Noncovalent Functionalization. Nano Lett. 2006;6(4):699-703. Epub Mar. 4, 2006.
Farmer et al., The oxidation of alcohols in substituted imidazolium ionic liquds using ruthenium catalyss. Green Chemistry.Feb. 6, 2002;4:97-102.

(56) References Cited

OTHER PUBLICATIONS

Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
International Preliminary Report on Patentability for PCT/US2012/041438 dated Dec. 27, 2013 (F0704.70005WO00).
International Preliminary Report on Patentability for PCT/US2014/071998 dated Jun. 30, 2016 (F0704.70044WO00).
International Preliminary Report on Patentability for PCT/US2015/055032 dated Apr. 20, 2017 (F0704.70053WO00).
International Preliminary Report on Patentability for PCT/US2017/064152 dated Jun. 13, 2019 (F0704.70084WO00).
International Search Report and Written Opinion for PCT/US12/45994 dated Dec. 26, 2012 (F0704.70009WO00).
International Search Report and Written Opinion for PCT/US2007068314 dated Feb. 13, 2008.
International Search Report and Written Opinion for PCT/US2012/039342 dated Dec. 6, 2012 (F0704.70003WO000).
International Search Report and Written Opinion for PCT/US2012/041438 dated Nov. 19, 2012 (F0704.70005WO00).
International Search Report and Written Opinion for PCT/US2012/047474 dated Oct. 16, 2012 (F0704.70010WO00).
International Search Report and Written Opinion for PCT/US2013/027697 dated Jun. 26, 2013 (F0704.70023WO00).
International Search Report and Written Opinion for PCT/US2014/071998 dated Oct. 12, 2015 (F0704.70044WO00).
International Search Report and Written Opinion for PCT/US2015/055032 dated May 12, 2016 (F0704.70053WO00).
International Search Report and Written Opinion for PCT/US2017/064152 dated Mar. 22, 2018 (F0704.70084WO00).
International Search Report for PCT US2014/029992 dated Oct. 7, 2014 (F0704.70033WO00).
International Search Report PCT/US2014/030310 dated Oct. 10, 2014 (F0704.70034WO00).
Johnson et al., Thermocompression bonding of vertically aligned carbon nanotube turfs to metalized substrates. Nanotechnology. Jan. 15, 2009;20(6):065703. 6 pages.
Koch, "Electrochemical Double Layer Capacitors for High Temperature Applications," 14th International Seminar on Double Layer Capacitors and Hybrid Energy Storage Devices, 608 Dec. 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007. 19 pages.
Kurtz et al., Chemical vapor deposition of titanium nitride at low temperatures. Thin Solid Films. Jul. 1, 1986;140(2):277-90.
Lee et al., High-power lithium batteries from functionalized carbon-nanotube electrodes. Nature Nanotechnology. 2010;5:531-7. Epub Jun. 20, 2010.
Liu, et al., "Graphene-Based Supercapacitor with an Ultrahigh Energy Density," Nano Lett., pp. 4863-4868, Nov. 8, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Maxwell Active Cell Voltage Management Electronics Document #1011130. Maxwell Technologies. Published Feb. 17, 2007.9 pages.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Morris et al., High-energy, rechargeable Li-ion battery based on carbon nanotube technology. Journal of Power Sources. Nov. 15, 2004;138(1-2):277-80.
Murakami, et al., "Growth Of Vertically Aligned Single-walled Carbon Nanotube Films On Quartz Substrates And Their Optical Anisotropy," Chem. Phys. Lett., Feb. 2004, pp. 298-303, vol. 385.
Ng et al., Single wall carbon nanotube paper as anode for lithium-ion battery. Electrochimica Acta. Oct. 5, 2005;51(1):23-8.
Ngo, et al., "Thermal properties of imidazolium ionic liquids," Thermochimica Acta, pp. 97-102, Aug. 14, 2000, vol. 357-58.
Nishida, et al., "Physical and electrochemical properties of 1-alkyl-3-methylimidazolium tetrafluoroborate for electrolyte," J. Fluorine Chem., pp. 135-141, Apr. 2003, vol. 120.
Smithyman et al. ; "Binder-free composite electrodes using carbon nanotube networks as a host matrix for activated carbon microparticles"; Appl Phys A; 107; Feb. 2012; pp. 723-731.
Xu et al.; "Binder-free activated carbon/carbon nanotube paper electrodes for use in supercapacitors"; Nano Res.; 4(9); Apr. 2011; pp. 870-881.

* cited by examiner

| Neocarbonix LIB Pouch Cell Parameters | Descriptions |
|---|---|
| Cell Capacity | ≥5 Ah |
| Specific Energy | ≥300 Wh/kg |
| Energy Density | ≥800 Wh/L |
| Cycle Life under 1C-Rate Charge-Discharge | ≥500 cycles |
| 5C-Rate Charge-Discharge Capacity Retention | ≥50% |

Fig. 9

| CATHODE | | RESULTS | |
|---|---|---|---|
| Cathode active layer thickness (um) | 150 | Cathode active layer thickness (um) | 150 |
| Cathode battery material specific capacity (mAh/g) | 220 | Anode active layer thickness (um) | 195.3 |
| Cathode 3D nanocarbon specific capacity (mAh/g) | 33 | Separator thickness (um) | 20 |
| Battery material to total cathode weight (%) | 97 | Total cathode weight (g/cm$^2$) (+electrolyte) | 0.0549 |
| Binder to total cathode weight (%) | 0 | Total anode weight (g/cm$^2$) (+electrolyte) | 0.0413 |
| Cathode electrode porosity (%) | 30 | Total electrolyte weight (g/cm$^2$) | 0.0145 |
| Al foil thickness (um) (X2) | 12 | | |
| | | | |
| ANODE | | | |
| Anode active layer specific capacity (mAh/g) | 372 | | |
| Binder to total anode weight (%) | 0 | | |
| Lithium to anode material weight (%) | 0 | | |
| Anode electrode porosity (%) | 30 | | |
| Anode capacity/cathode capacity | 1.1 | Specific energy (w/o package) (Wh/kg) | 382.45 |
| Cu foil thickness (um) (X2) | 8 | Specific energy (including package) (Wh/kg) | 325.08 |
| | | | |
| SEPARATOR | | Energy density (w/o package) (Wh/L) | 1002.60 |
| Separator porosity (%) | 50 | Energy density (including package) (Wh/L) | 852.21 |
| Separator thickness (um) | 20 | | |
| | | | |
| CELL VOLTAGE | | | |
| Upper voltage (V) | 4.20 | | |
| Lower voltage (V) | 3.00 | | |
| Battery cell voltage (V) | 3.7 | | |
| | | | |
| Package efficiency (%) | 85 | | |

Fig. 10
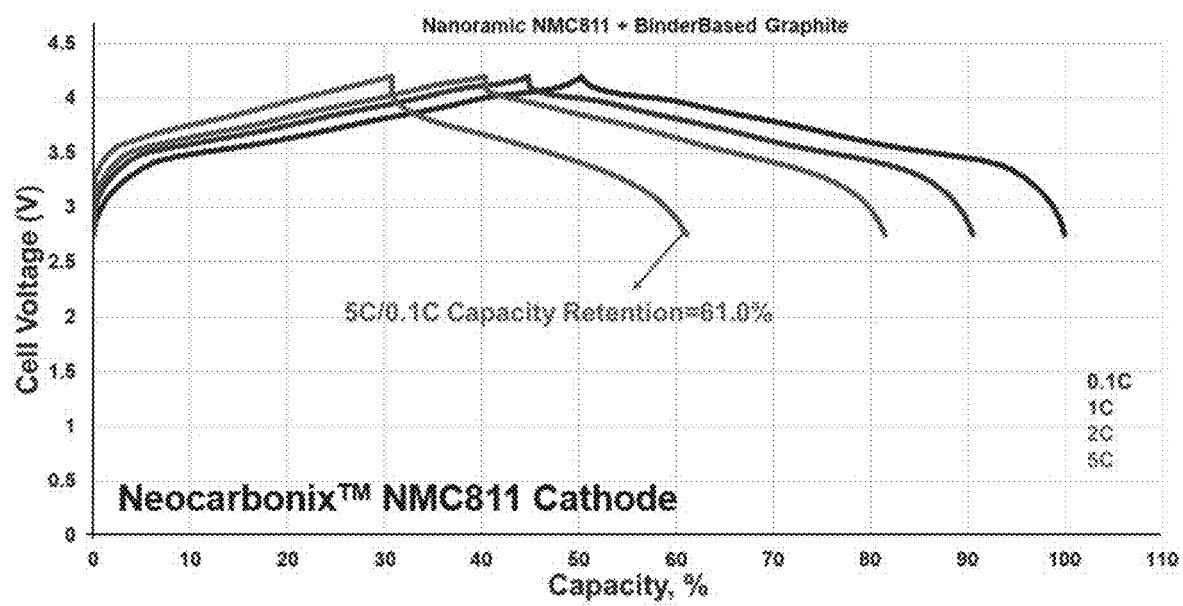
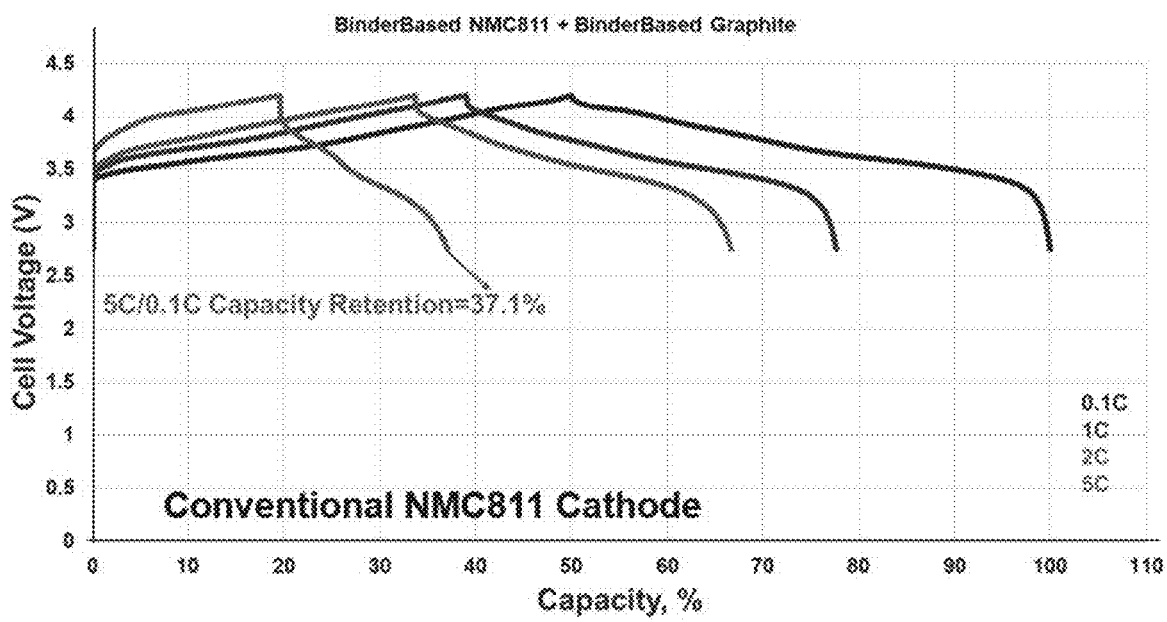

ELECTRODES FOR ENERGY STORAGE DEVICES

CROSS REFERENCE TO RELATED APPLICATIONS

The present application is a continuation of Ser. No. 17/114,153, filed Dec. 7, 2020, which is a continuation of PCT Application No. PCT/US2020/040943, filed Jul. 6, 2020, which claims the benefits of and priority to each of U.S. Provisional Pat. App. Ser. No. 63/041,801, filed Jun. 19, 2020; U.S. Provisional Pat. App. Ser. No. 63/003,341 filed Apr. 1, 2020; U.S. Provisional Pat. App. Ser. No. 62/954,771, filed Dec. 30, 2019; U.S. Provisional Pat. App. Ser. No. 62/876,124, filed Jul. 19, 2019; and U.S. Provisional Pat. App. Ser. No. 62/871,041, filed Jul. 5, 2019. The entire contents of each of the foregoing references are incorporated herein by reference.

BACKGROUND

Lithium batteries are used in many products including medical devices, electric cars, airplanes, and consumer products such as laptop computers, cell phones, and cameras. Due to their high energy densities, high operating voltages, and low-self discharges, lithium ion batteries have overtaken the secondary battery market and continue to find new uses in products and developing industries.

Generally, lithium ion batteries ("LIBs" or "LiBs") comprise an anode, a cathode, and an electrolyte material such as an organic solvent containing a lithium salt. More specifically, the anode and cathode (collectively, "electrodes") are formed by mixing either an anode active material or a cathode active material with a binder and a solvent to form a paste or slurry which is then coated and dried on a current collector, such as aluminum or copper, to form a film on the current collector. The anodes and cathodes are then layered or coiled prior to being housed in a pressurized casing containing an electrolyte material, which all together forms a lithium ion battery.

In conventional electrodes binder is used with sufficient adhesive and chemical properties such that the film coated on the current collector will maintain contact with the current collector even when manipulated to fit into the pressurized battery casing. Since the film contains the electrode active material, there will likely be significant interference with the electrochemical properties of the battery if the film does not maintain sufficient contact with the current collector. Further, it has been important to select a binder that is mechanically compatible with the electrode active material(s) such that it is capable of withstanding the degree of expansion and contraction of the electrode active material(s) during charging and discharging of the battery.

Accordingly, binders such as cellulosic binder or cross-linked polymeric binders have been used to provide good mechanical properties. However, such binder materials have disadvantageous effects. For example, the bulk of the binder fills volume in the electrode active layer which otherwise could be used to increase the mass loading of active material and decrease the electrical conductivity of the electrode. Moreover, binders tend to react electrochemically with the electrolyte used in the cell (especially in high voltage, high current, and/or high temperature applications), resulting in degradation of the performance of the cell.

SUMMARY

The applicants have realized that an electrode may be constructed to exhibit excellent mechanical stability without the need for bulk polymer binders. In one aspect, the present disclosure describes embodiments of an electrode active layer that includes a network of high aspect ratio carbon elements (e.g., carbon nanotubes, carbon nanotube bundles, graphene flakes, or the like) that provides a highly electrically conductive scaffold that entangles or enmeshes the active material, thereby supporting the layer. As detailed below, a surface treatment can be applied to the high aspect ratio carbon elements to promote adhesion to the active material and any underlying electrode layers (e.g., a current collector layer) improving the overall cohesion and mechanical stability of the active layer. This surface treatment forms only a thin (in some cases even monomolecular) layer on the network, leaving the large void spaces that are free of any bulk binder material and so may instead be filled with active material. The resulting active layer may be formed with excellent mechanical stability even at large thickness and high active material mass loading.

In another aspect, the present disclosure describes a method including dispersing high aspect ratio carbon elements and a surface treatment material in a solvent to form an initial slurry, wherein said dispersion step results in the formation of a surface treatment on the high aspect ratio carbon; mixing active materials into the first slurry to form a final slurry; coating the final slurry onto a substrate; and drying the final slurry to form an electrode active layer.

Various embodiments may include any of the features or elements described herein, individually or in any suitable combination.

BRIEF DESCRIPTION OF THE DRAWINGS

FIG. 9 shows a summary of functional parameters for a pouch cell battery.

FIG. 10 shows the results of a comparative performance evaluation of a pouch cell battery featuring a binder free cathode (left plot) and a pouch cell battery featuring a binder based cathode (right plot).

DETAILED DESCRIPTION

Figure 1:
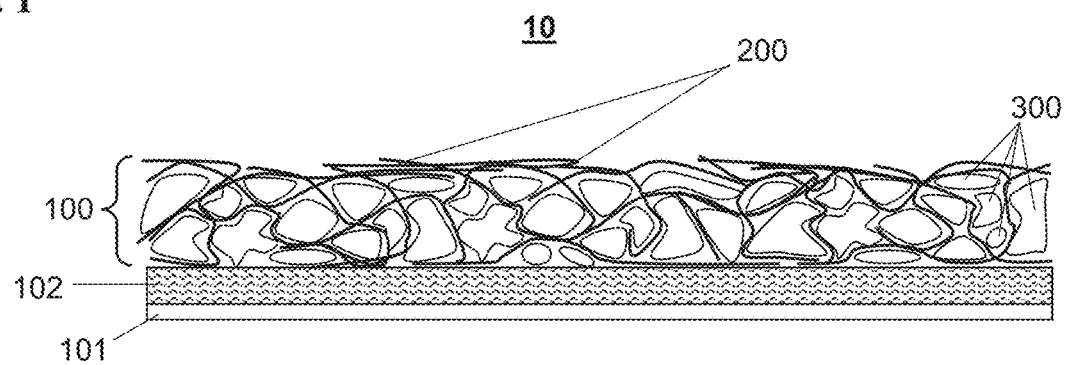
FIG. 1 is a schematic of an electrode featuring an active material layer.

Referring to FIG. 1, an electrode 10 is shown which includes an active layer 100 disposed on a current collector 101. Some embodiment may include an optional adhesion layer 102 disposed between the active layer 101 and the current collector 102. In other embodiments, the adhesion layer 102 may be omitted.

The current collector 101 may be an electrically conductive layer, such as a metal foil. The optional adhesion layer 102 (which may be omitted in some embodiments) may be a layer of material that promotes adhesion between the current collector 102 and the active layer 100. Examples of suitable materials for the current collector 101 and the optional adhesion layer 102 are described in International Patent Publication No. WO/2018/102652 published Jun. 7, 2018.

Electrode Active Layer

In some embodiments, the active layer 100 may include a three-dimensional network 200 of high aspect ratio carbon elements 201 defining void spaces within the network 200. A plurality of active material particles 300 are disposed in the void spaces within the network 200. Accordingly, the active material particles are enmeshed or entangled in the network 200, thereby improving the cohesion of the active layer 100.

In some embodiments, a surface treatment 202 (not shown, refer to FIG. 2) is applied on the surface of the high aspect ratio carbon elements 201 of the network 200. The surface treatment promotes adhesion between the high aspect ratio carbon elements and the active material particles 300. The surface treatment may also promote adhesion between the high aspect ratio carbon elements and the current collector 100 (also referred to herein as a "conductive layer") and/or the option adhesion layer 102.

As used herein, the term "high aspect ratio carbon elements" refers to carbonaceous elements having a size in one or more dimensions (the "major dimension(s)") significantly larger than the size of the element in a transverse dimension (the "minor dimension").

For example, in some embodiments the high aspect ratio carbon elements 201 may include flake or plate shaped elements having two major dimensions and one minor dimension. For example, in some such embodiments, the ratio of the length of each of the major dimensions may be at least 5 times, 10 times, 100 times, 500 times, 1,000 times, 5,000 times, 10,000 times or more of that of the minor dimension. Exemplary elements of this type include graphene sheets or flakes.

For example, in some embodiments the high aspect ratio carbon elements 201 may include elongated rod or fiber shaped elements having one major dimension and two minor dimensions. For example, in some such embodiments, the ratio of the length of the major dimensions may be at least 5 times, 10 times, 100 times, 500 times, 1,000 times, 5,000 times, 10,000 times or more of that of each of the minor dimensions. Exemplary elements of this type include carbon nanotubes, bundles of carbon nanotubes, carbon nanorods, and carbon fibers.

In some embodiments, the high aspect ratio carbon elements 201 may include single wall nanotubes (SWNT), double wall nanotubes (DWNT), or multiwall nanotubes (MWNT), carbon nanorods, carbon fibers or mixtures thereof. In some embodiments, the high aspect ratio carbon elements 201 may be formed of interconnected bundles, clusters, or aggregates of CNTs or other high aspect ratio carbon materials. In some embodiments, the high aspect ratio carbon elements 201 may include graphene in sheet, flake, or curved flake form, and/or formed into high aspect ratio cones, rods, and the like.

In some embodiments, the electrode active layer 100 may contain little or no bulk binder material, leaving more space in the network 200 to be occupied by active material particles 300. For example, in some embodiments, the active layer 200 contains less than 10% by weight, less than 1% by weight, less than 0.1% by weight, less than 0.01% by weight, or less of binder material (e.g., polymeric or cellulosic binder material) disposed in the void spaces.

For example, in some embodiments the electrode active layer is free of or substantially free of polymeric material, or any material other than the active material 300, and the network 200 composed of the high aspect ratio carbon elements 201 and the surface treatment 202 disposed thereon.

In some embodiments, the network 200 is composed largely or even entirely of carbon. For example, in some embodiments the network 200 is at least 90% carbon by weight, at least 95% carbon by weight, at least 96% carbon by weight, at least 97% carbon by weight, at least 98% carbon by weight at least 99% carbon by weight, at least 99.5% carbon by weight, at least 99.9% carbon by weight, or more.

In some embodiments, a size (e.g., the average size, median size, or minimum size) of the high aspect ratio carbon elements 201 forming the network 200 along one or two major dimensions may be at least 0.1 µm, 0.5 µm, 1 µm, 5 µm, 10 µm, 50 µm, 100 µm, 200 µm, 300, µm, 400 µm, 500 µm, 600 µm, 7000 µm, 800 µm, 900 µm, 1,000 µm or more. For example, in some embodiments, the size (e.g., the average size, median size, or minimum size) of the elements 201 forming the network 200 may be in the range of 1 µm to 1,000 µm, or any subrange thereof, such as 1 µm to 600 µm.

In some embodiments, the size of the elements can be relatively uniform. For example, in some embodiments, more than 50%, 60%, 70%, 80%, 90%, 95%, 99% or more of the elements 201 may have a size along one or two major dimensions within 10% of the average size for the elements 201 making up the network 200.

Applicants have found that an active layer 100 of the type herein can provide exemplary performance (e.g., high conductivity, low resistance, high voltage performance, and high energy and power density) even when the mass fraction of elements 201 making up the network 200 in the layer 100 is quite low, thereby allowing high mass loading of active material particles 300. For example, in some embodiments, the active layer 100 may be at least about 50 wt % (percent by weight), 60 wt %, 70 wt %, 75 wt %, 80 wt %, 85 wt %, 90 wt %, 95 wt %, 96 wt % 97 wt %, 98 wt %, 99 wt %, 99.5 wt %, or more of active material particles 300.

In some embodiments, the network 200 forms an interconnected network of highly electrically conductive paths for current flow (e.g. electron or ion transport) through the active layer 100. For example, in some embodiments, highly conductive junctions may occur at points where the elements 201 of the network intersect with each other, or where they are in close enough proximity to allow for quantum tunneling of charge carriers (e.g., electrons or ions) from one element to the next. While the elements 201 may make up a relatively low mass fraction of the active layer (e.g., less than 10 wt %, 5 wt %, 4 wt %, 3 wt %, 2 wt %, 1 wt % or less, e.g., in the range of 0.5 wt % to 10 wt % or any subrange thereof such as 1 wt % to 5.0 wt %), the interconnected network of highly electrically conductive paths formed in the network 200 may provide long conductive paths to facilitate current flow within and through the active layer 100 (e.g. conductive paths on the order of the thickness of the active layer 100).

For example, in some embodiments, the network 200 may include one or more structures of interconnected elements 201, where the structure has an overall length along one or more dimensions longer than 2, 3, 4, 5, 10, 20, 50, 100, 500, 1,000, 10,000 or more times the average length of the component elements 201 making up the structure. For example, in some embodiments, network 200 may include one or more structures of interconnected elements 200, where the structure has an overall length in the range of 2 to 10,000 (or any subrange thereof) times the average length of the component elements 201 making up the structure. For example, in some embodiments the network 200 may include highly conductive pathways having a length greater than 100 µm, 500 µm, 1,000 µm, 10,000 µm or more, e.g., in the range of 100 µm-10,000 µm of any subrange thereof.

As used herein, the term "highly conductive pathway" is to be understood as a pathway formed by interconnected elements 201 having an electrical conductivity higher than the electrical conductivity of the active material particles enmeshed in the network 200.

Not wishing to be bound by theory, in some embodiments the network 200 can characterized as an electrically interconnected network of elements 201 exhibiting connectivity above a percolation threshold. Percolation threshold is a mathematical concept related to percolation theory, which is the formation of long-range connectivity in random systems. Below the threshold a so called "giant" connected component of the order of system size does not exist; while above it, there exists a giant component of the order of system size.

In some embodiments, the percolation threshold can be determined by increasing the mass fraction of elements 201 in the active layer 100 while measuring the conductivity of the layer, holding all other properties of the layer constant. In some such cases, the threshold can be identified with the mass fraction at which the conductivity of the layer sharply increases and/or the mass fraction above which the conductivity of the layer increases only slowly with increases with the addition of more elements 201. Such behavior is indicative of crossing the threshold required for the formation of interconnected structures that provide conductive pathways with a length on the order of the size of the active layer 100.

Figure 2:
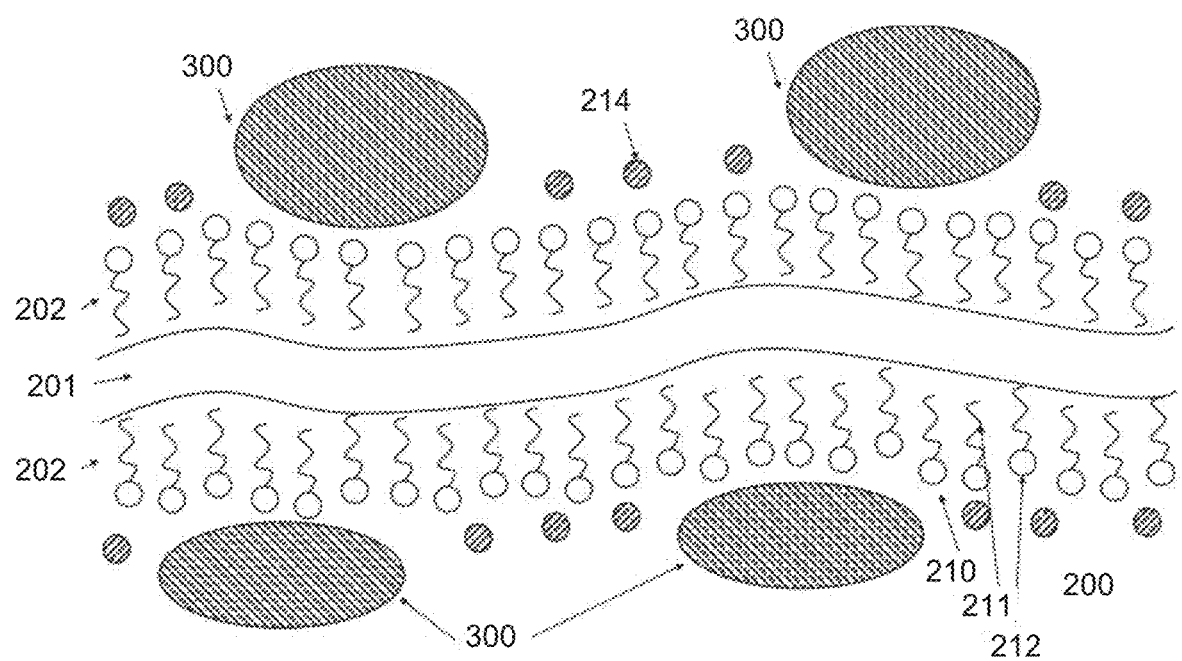
FIG. 2 is a detailed illustration of an embodiment of an active material layer.

FIG. 2 shows a detailed view of high aspect ratio carbon element 201 of the network 200 (as shown in FIG. 1), located near several active material particles 300. In the embodiment shown, the surface treatment 202 on the element 201 is a surfactant layer bonded to the outer layer of the surface of the element 201. As shown, the surfactant layer comprises a plurality of surfactant elements 210 each having a hydrophobic end 211 and a hydrophilic end 212, wherein the hydrophobic end is disposed proximal the surface of the carbon element 201 and the hydrophilic end 212 is disposed distal the surface.

In some embodiments where the carbon element 201 is hydrophobic (as is typically the case with nanoform carbon elements such as CNTs, CNT bundles, and graphene flakes), the hydrophobic end 211 of the surfactant element 210 will be attracted to the carbon element 201. Accordingly, in some embodiments, the surface treatment 202 may be a self-assembling layer. For example, as detailed below, in some embodiments, when the elements 201 are mixed in a solvent with a surfactant elements 210 to form a slurry, the surface treatment 202 layer self assembles on the surface due to electrostatic interactions between the elements 201 and 210 within the slurry.

In some embodiments, the surface treatment 202 may a self-limiting layer. For example, as detailed below, in some embodiments, when the elements 201 are mixed in a solvent with a surfactant elements 210 to form a slurry, the surface treatment 202 layer self assembles on the surface due to electrostatic interactions between the elements 201 and 210 within the slurry. In some such embodiments, once an area of the surface of the element 201 is covered in surfactant elements 210, additional surfactant elements 210 will not be attracted to that area. In some embodiments, once the surface of the element 201 is covered with surfactant elements 202, further elements are repulsed from the layer, resulting in a self-limiting process. For example, in some embodiments the surface treatment 202 may form in a self-limiting process, thereby ensuring that the layer will be thin, e.g., a single molecule or a few molecules thick.

In some embodiments, the hydrophilic ends 212 of at least a portion of the surfactant elements form bonds with the active material particles 300. Accordingly, the surface treatment 202 can provide good adhesion between the elements 201 of the network 200 and the active material particles. In some embodiments, the bonds may be covalent bonds, or non-covalent bonds such as $\pi$-$\pi$ bonds, hydrogen bonds, electrostatic bonds or combinations thereof.

For example, in some embodiments, the hydrophilic end 212 of the surfactant element 210 has a polar charge of a first polarity; while the surface of the active material particles 300 carry a polar charge of a second polarity opposite that of the first polarity, and so are attracted to each other.

For example, in some embodiments where, during formation of the layer 100, the active material particles 300 are combined in a solvent with carbon elements 201 bearing the surface treatment 202 (as described in greater detail below), the outer surface of the active material particles 300 may be characterized by a Zeta potential (as is known in the art) having the opposite sign of the Zeta potential of the outer surface of the surface treatment 202. Accordingly, in some such embodiments, attractions between the carbon elements 201 bearing the surface treatment 202 and the active material products 300 promote the self-assembly of a structure in which the active material particles 300 are enmeshed with the carbon elements 201 of the network 200.

In some embodiments the hydrophilic ends 212 of at least a portion of the surfactant elements form bonds with a current collector layer or adhesion layer underlying the active material layer 100. Accordingly, the surface treatment 202 can provide good adhesion between the elements 201 of the network 200 and such underlying layer. In some embodiments, the bonds may be covalent bonds, or non-covalent bonds such as $\pi$-$\pi$ bonds, hydrogen bonds, electrostatic bonds or combinations thereof. In some embodiments, this arrangement provides for excellent mechanical stability of the electrode 10, as discussed in greater detail below.

In various embodiments, the surfactant used to form the surface treatment 202 as described above may include any suitable material. For example, in some embodiments the surfactant may include one or more of the following: hexadecyltrimethylammonium hexafluorophosphate (CTAP), hexadecyltrimethylammonium tetrafluoroborate (CTAB), hexadecyltrimethylammonium acetate, hexadecyltrimethylammonium nitrate, hocamidopropyl betaine, N-(cocoalkyl)-N,N,N-trimethylammonium methyl sulfate, and cocamidopropyl betaine. Additional suitable materials are described below.

In some embodiments, the surfactant layer 202 may be formed by dissolving a compound in a solvent, such that the layer of surfactant is formed from ions from the compound (e.g., in a self-limiting process as described above). In some such embodiments, the active layer 100 will then include residual counter ions 214 to the surfactant ions forming the surface treatment 202.

In some embodiments, these surfactant counter ions 214 are selected to be compatible with use in an electrochemical cell. For example, in some embodiments, the counter ions are selected to be unreactive or mildly reactive with materials used in the cell, such as an electrolyte, separator, housing, or the like. For example, if an aluminum housing is used the counter ion may be selected to be unreactive or mildly reactive with the aluminum housing.

For example, in some embodiments, the residual counter ions are free or substantially free of halide groups. For example, in some embodiments, the residual counter ions are free or substantially free of bromine.

In some embodiments, the residual counter ions may be selected to be compatible with an electrolyte used in an energy storage cell containing the active layer 200. For example, in some embodiments, residual counter ions maybe the same species of ions used in the electrolyte itself. For example, if the electrolyte includes a dissolved Li $PF_6$ salt, the electrolyte anion is $PF_6$. In such a case, the surfactant may be selected as, for example, CTA PF6, such that the surface treatment 202 is formed as a layer of anions from the CTA PF6, while the residual surfactant counter ions are the $PF_6$ anions from the CTA PF6 (thus matching the anions of the electrolyte).

In some embodiments, the surfactant material used may be soluble in a solvent which exhibits advantageous properties. For example, in some embodiments, the solvent may include water or an alcohol such as methanol, ethanol, or 2-propanol (isopropyl alcohol, sometimes referred to as IPA) or combinations thereof. In some embodiments, the solvent may include one or more additives used to further improve the properties of the solvent, e.g., low boiling point additives such as acetonitrile (ACN), de-ionized water, and tetrahydrofuran.

For example, if a low boiling point solvent is used in the formation of the surface treatment 202, the solvent may be quickly removed using a thermal drying process (e.g., of the type described in greater detail below) performed at a relatively low temperature. As will be understood by those skilled in the art, this can improve the speed and or cost of manufacture of the active layer 202.

For example, in some embodiments, the surface treatment 202 is formed from a material which is soluble in a solvent having a boiling point less than 250° C., 225° C., 202° C., 200° C., 185° C., 180° C., 175° C., 150° C., 125° C., or less, e.g., less than or equal to 100° C.

In some embodiments, the solvent may exhibit other advantageous properties. In some embodiments the solvent may have a low viscosity, such a viscosity at 20° C. of less than or equal to 3.0 centipoise, 2.5 centipoise, 2.0 centipoise, 1.5 centipoise, or less. In some embodiments the solvent may have a low surface tension such a surface tension at 20° C. of less than or equal to 40 mN/m, 35 mN/m, 30 mN/m, 25 mN/m or less. In some embodiments the solvent may have a low toxicity, e.g., toxicity comparable to alcohols such as isopropyl alcohol.

Notably, this contrasts with the process used to form conventional electrode active layers featuring bulk binder materials such as polyvinylidene fluoride or polyvinylidene difluoride (PVDF). Such bulk binders require aggressive solvents often characterized by high boiling points. One such example is n-methyl-2-pyrrolidone (NMP). Use of NMP (or other pyrrolidone based solvents) as a solvent requires the use of high temperate drying processes to remove the solvent. Moreover, NMP is expensive, requiring a complex solvent recovery system, and highly toxic, posing significant safety issues. In contrast, as further detailed below, in various embodiments the active layer 200 may be formed without the use of NMP or similar compounds such pyrrolidone compounds.

While one class of exemplary surface treatment 202 is described above, it is understood that other treatments may be used. For example, in various embodiments the surface treatment 202 may be formed by functionalizing the high aspect ratio carbon elements 201 using any suitable technique as described herein or known in the art. Functional groups applied to the elements 201 may be selected to promote adhesion between the active material particles 300 and the network 200. For example, in various embodiments the functional groups may include carboxylic groups, hydroxylic groups, amine groups, silane groups, or combinations thereof.

As will be described in greater detail below, in some embodiments, the functionalized carbon elements 201 are formed from dried (e.g., lyophilized) aqueous dispersion comprising nanoform carbon and functionalizing material such as a surfactant. In some such embodiments, the aqueous dispersion is substantially free of materials that would damage the carbon elements 201, such as acids.

Figure 3:
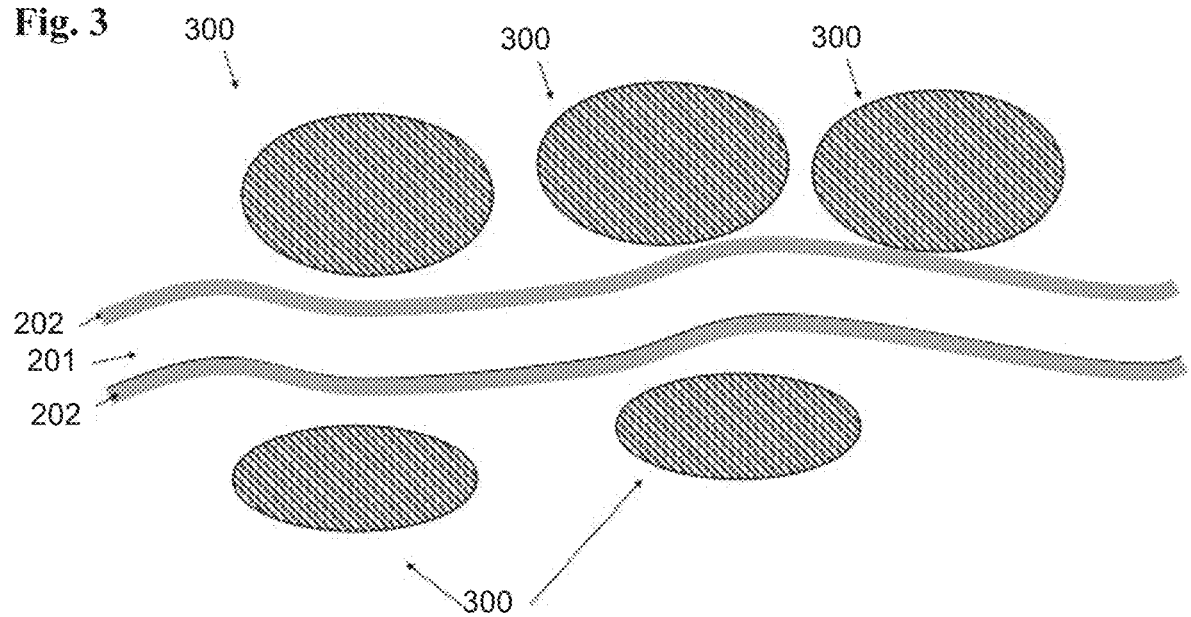
FIG. 3 is a detailed illustration of another embodiment active material layer.

Referring to FIG. 3, in some embodiments, the surface treatment 202 on the high aspect ratio carbon elements 201 includes a thin polymeric layer disposed on the carbon elements that promotes adhesion of the active material to the network. In some such embodiments the thin polymeric layer comprises a self-assembled and or self-limiting polymer layer. In some embodiments, the thin polymeric layer bonds to the active material, e.g., via hydrogen bonding.

In some embodiments the thin polymeric layer may have a thickness in the direction normal to the outer surface of the carbon elements of less that 3 times, 2 times, 1 times, 0.5 times, 0.1 times that the minor dimension of the element 201 (or less).

In some embodiments, the thin polymeric layer includes functional groups (e.g., side functional groups) that bond to the active material, e.g., via non-covalent bonding such a π-π bonding. In some such embodiments the thin polymeric layer may form a stable covering layer over at least a portion of the elements 201.

In some embodiments, the thin polymeric layer on some of the elements 201 may bond with a current collector 101 or adhesion layer 102 underlying the active layer 200. For example, in some embodiments the thin polymeric layer includes side functional groups that bond to the surface of the current collector 101 or adhesion layer 102, e.g., via non-covalent bonding such a π-π bonding. in some such embodiments the thin polymeric layer may form a stable covering layer over at least a portion of the elements 201. In some embodiments, this arrangement provides for excellent mechanical stability of the electrode 10, as discussed in greater detail below.

In some embodiments, the polymeric material is miscible in solvents of the type described in the examples above. For example, in some embodiments the polymeric material is miscible in a solvent that includes an alcohol such as methanol, ethanol, or 2-propanol (isopropyl alcohol, sometimes referred to as IPA) or combinations thereof. In some embodiments, the solvent may include one or more additives used to further improve the properties of the solvent, e.g., low boiling point additives such as acetonitrile (ACN), de-ionized water, and tetrahydrofuran.

Suitable examples of materials which may be used to form the polymeric layer include water soluble polymers such as polyvinylpyrrolidone. Additional exemplary materials are provided below.

In some embodiments, the polymeric material has a low molecular mass, e.g., less than or equal to 1,000,000 g/mol, 500,000 g/mol, 100,000 g/mol, 50,000 g/mol, 10,000 g/mol, 5,000 g/mol, 2,500 g/mol or less.

Note that the thin polymeric layer described above is qualitatively distinct from bulk polymer binder used in conventional electrodes. Rather than filling a significant portion of the volume of the active layer 100, the thin polymeric layer resides on the surface of the high aspect ratio carbon elements, leaving the vast majority of the void space withing the network 200 available to hold active material particles 300.

For example, in some embodiments, the thin polymeric layer has a maximum thickness in a direction normal to an outer surface of the network of less than or equal to 1 times, 0.5 times, 0.25 times, or less of the size of the carbon elements 201 along their minor dimensions. For example, in some embodiments the thin polymeric layer may be only a few molecules thick (e.g., less than or equal to 100, 50, 10, 5, 4, 3, 2, or even 1 molecule(s) thick). Accordingly, in some embodiments, less than 10%, 5%, 1%, 0.1%, 0.01%, 0.001% or less of the volume of the active layer 100 is filled with the thin polymeric layer.

In yet further exemplary embodiments, the surface treatment 202 may be formed a layer of carbonaceous material which results from the pyrolization of polymeric material disposed on the high aspect ratio carbon elements 201. This layer of carbonaceous material (e.g., graphitic or amorphous carbon) may attach (e.g., via covalent bonds) to or otherwise promote adhesion with the active material particles 300. Examples of suitable pyrolization techniques are described in U.S. Patent Application Ser. No. 63/028,982 filed May 22, 2020. One suitable polymeric material for use in this technique is polyacrylonitrile (PAN).

In various embodiments, the active material particles 300 may include any active material suitable for use in energy storage devices, including metal oxides such as lithium metal oxides.

For example, the active material particles 300 may include lithium cobalt oxide (LCO, sometimes called "lithium cobaltate" or "lithium cobaltite," is a chemical compound with one variant of possible formulations being $LiCoO_2$); lithium nickel manganese cobalt oxide (NMC, with a variant formula of LiNiMnCo); lithium manganese oxide (LMO with variant formulas of $LiMn_2O_4$, $Li_2MnO_3$ and others); lithium nickel cobalt aluminum oxide (LiNiCoAlO$_2$ and variants thereof as NCA) and lithium titanate oxide (LTO, with one variant formula being $Li_4Ti_5O_{12}$); lithium iron phosphate oxide (LFP, with one variant formula being $LiFePO_4$), lithium nickel cobalt aluminum oxide (and variants thereof as NCA) as well as other similar other materials. Other variants of the foregoing may be included.

In some embodiments where NMC is used as an active material, nickel rich NMC may be used. For example, in some embodiments, the variant of NMC may be $LiNi_xMn_yCo_{1-x-y}$, where x is equal to or greater than about 0.7, 0.75, 0.80, 0.85, or more. In some embodiments, so called NMC811 may be used, where in the foregoing formula x is about 0.8 and y is about 0.1.

In some embodiments, the active material includes other forms of Lithium Nickel Manganese Cobalt Oxide ($LiNi_xMn_yCo_zO_2$). For example, common variants such as, without limitation: NMC 111 ($LiNi_{0.33}Mn_{0.33}Co_{0.33}O_2$); NMC 532 ($LiNi_{0.5}Mn_{0.3}Co_{0.2}O_2$); NMC 622 ($LiNi_{0.6}Mn_{0.2}Co_{0.2}O_2$); and others may be used.

In some embodiments, e.g., where the electrode is used as an anode, the active material may include graphite, hard carbon, activated carbon, nanoform carbon, silicon, silicon oxides, carbon encapsulated silicon nanoparticles. In some such embodiments the active layer 100 may be intercalated with lithium, e.g., using pre-lithiation methods known in the art.

In some embodiments, the techniques described herein may allow for the active layer 100 be made of in large portion of material in the active layer, e.g., greater than 75%, 80%, 85%, 90%, 95%, 99%, 99.5%, 99.8% or more by weight, while still exhibiting excellent mechanical properties (e.g., lack of delamination during operation in an energy storage device of the types described herein). For example, in some embodiments, the active layer may have such aforementioned high amount of active material and a large thickness (e.g., greater than 50 µm, 100 µm, 150 µm, 200 µm, or more), while still exhibiting excellent mechanical properties (e.g., a lack of delamination during operation in an energy storage device of the types described herein).

The active material particles 201 in the active layer 100 may be characterized by a median particle sized in the range of e.g., 0.1 µm and 50 micrometers µm, or any subrange thereof. The active material particles 201 in the active layer 100 may be characterized by a particle sized distribution which is monomodal, bi-modal or multi-modal particle size distribution. The active material particles 201 may have a specific surface area in the range of 0.1 meters squared per gram ($m^2/g$) and 100 meters squared per gram ($m^2/g$), or any subrange thereof.

In some embodiments, the active layer 100 may have mass loading of active material particles 300 e.g., of at least 20 mg/cm$^2$, 30 mg/cm$^2$, 40 mg/cm$^2$, 50 mg/cm$^2$, 60 mg/cm$^2$, 70 mg/cm$^2$, 80 mg/cm$^2$, 90 mg/cm$^2$, 100 mg/cm$^2$, or more.

Figure 4:
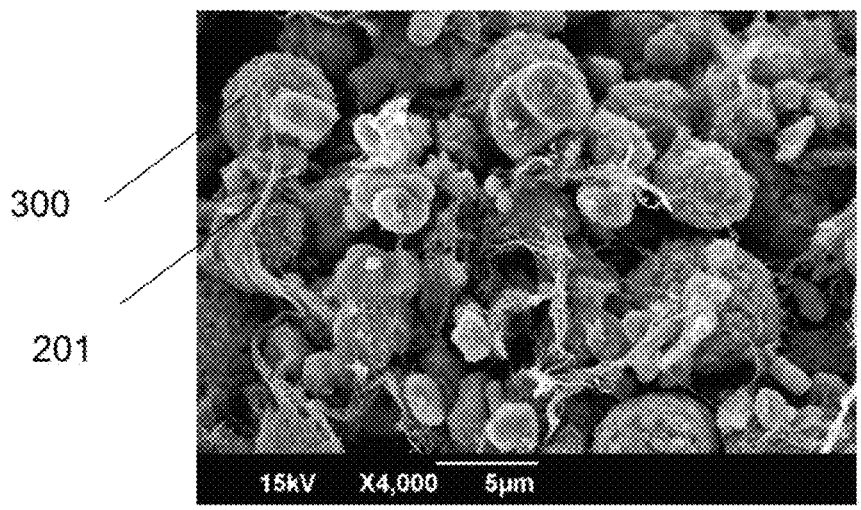
FIG. 4 is an electron micrograph of an active material of the type described herein.

Referring to FIG. 4, an electron micrograph of an exemplary active material layer of the type described herein is shown. Tendril like high aspect ratio carbon elements 201 (formed of CNT bundles) are clearly shown enmeshing the active material particles 300. Note the lack of any bulky polymeric material taking up space within the layer.

Energy Storage Cell

Figure 5:
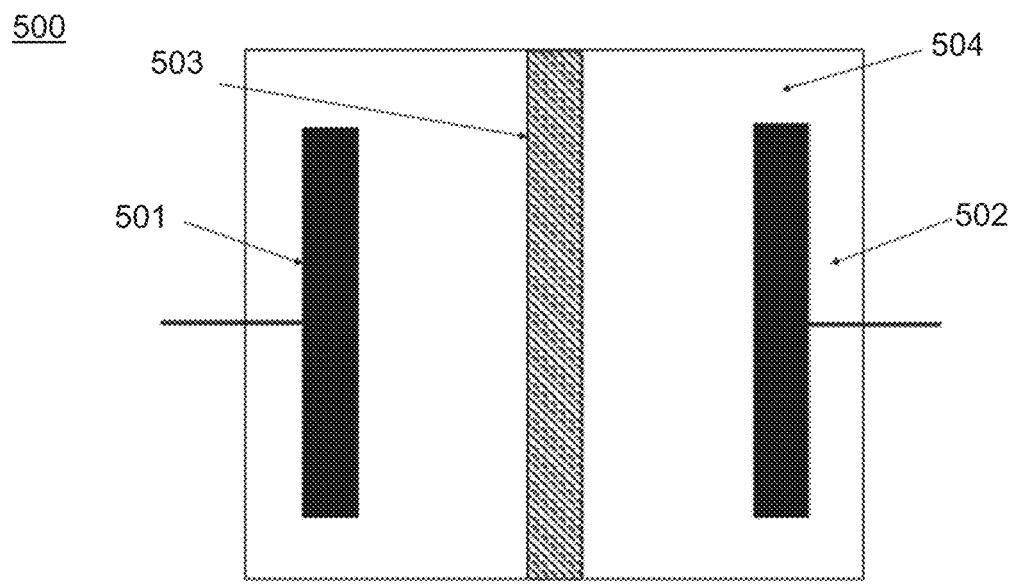
FIG. 5 is a schematic of an energy storage cell.

Referring to FIG. 5, an energy storage cell 500 is shown which includes a first electrode 501 a second electrode 502, a permeable separator 503 disposed between the first electrode 501 and the second electrode 502, and an electrolyte 504 wetting the first and second electrodes. One or both of the electrodes 501, 502 may be of the type described herein.

In some embodiments, the energy storage cell 500 may be a battery, such as a lithium ion battery. In some such embodiments, the electrolyte may be a lithium salt dissolved in a solvent, e.g., of the types described in Qi Li, Juner Chen, Lei Fan, Xueqian Kong, Yingying Lu, Progress in electrolytes for rechargeable Li-based batteries and beyond, Green Energy & Environment, Volume 1, Issue 1, Pages 18-42, the entire contents of which are incorporated herein by reference.

In some such embodiments, the energy storage cell may have an operational voltage in the range of 1.0 V to 5.0 V, or any subrange thereof such as 2.3V-4.3V.

In some such embodiments, the energy storage cell 500 may have an operating temperature range comprising −40° C. to 100° C. or any subrange thereof such as −10° C. to 60° C.

In some such embodiments, the energy storage cell 500 may have a gravimetric energy density of at least 100 Wh/kg, 200 Wh/kg, 300 Wh/kg, 400 Wh/kg, 500 Wh/kg, 1000 Wh/kg or more.

In some such embodiments, the energy storage cell 500 may have a volumetric energy density of at least 200 Wh/L, 400 Wh/L, 600 Wh/L, 800 Wh/L, 1,000 Wh/L, 1,500 Wh/L, 2,000 Wh/L or more.

In some such embodiments, the energy storage cell 500 may have a C rate in the range of 0.1 to 50.

In some such embodiments, the energy storage cell 500 may have a cycle life of at least 1,000, 1500, 2,000, 2,500, 3,000, 3,500, 4,000 or more charge discharge cycles.

In some embodiments, the energy storage cell 500 may be a lithium ion capacitor of the type described in U.S. Pat. App. Ser. No. 63/021,492, filed May 8, 2020, the entire contents of which are incorporated herein by reference.

In some such embodiments, the energy storage cell 500 may have an operating temperature range comprising −60° C. to 100° C. or any subrange thereof such as −40° C. to 85° C.

In some such embodiments, the energy storage cell 500 may have a gravimetric energy density of at least 10 Wh/kg, 15 Wh/kg, 20 Wh/kg, 30 Wh/kg, 40 Wh/kg, 50 Wh/kg, or more.

In some such embodiments, the energy storage cell 500 may have a volumetric energy density of at least 20 Wh/L, 30 Wh/L, 40 Wh/L, 50 Wh/L, 60 Wh/L, 70 Wh/L, 80 Wh/L or more.

In some such embodiments, the energy storage cell 500 may have a gravimetric power density of at least 5 kW/kg, 7.5 W/kg, 10 kW/kg, 12.5 kW/kg, 14 kW/kg, 15 kW/kg or more.

In some such embodiments, the energy storage cell 500 may have a volumetric power density of at least 10 kW/L, 15 kW/L, 20 kW/L, 22.5 kW/L, 25 kW/L, 28 kW/L, 30 kW/L or more.

In some such embodiments, the energy storage cell 500 may have a C rate in the range of 1.0 to 100.

In some such embodiments, the energy storage cell 500 may have a cycle life of at least 100,000, 500,000, 1,000,000 or more charge discharge cycles.

Fabrication Methods

The electrode 10 featuring active layer 100 as described herein may be made using any suitable manufacturing process. As will be understood by one skilled in the art, in some embodiments the electrode 10 may be made using wet coating techniques of the types described in International Patent Publication No. WO/2018/102652 published Jun. 7, 2018 in further view of the teachings described herein.

Figure 6:
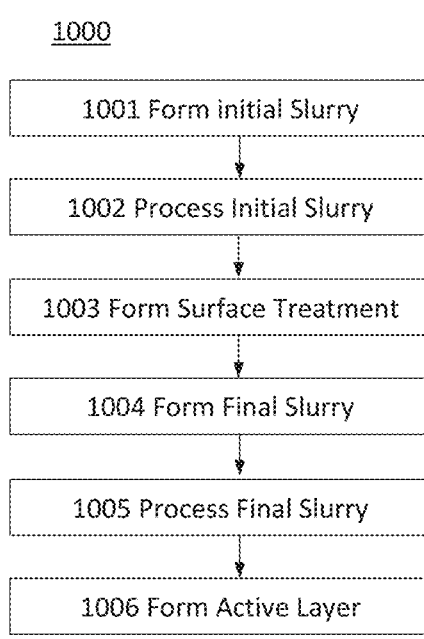
FIG. 6 is a flow chart illustrating a method of making the electrode of FIG. 1.

Referring to FIG. 6, in some embodiments, the active layer 100 of electrode 10 may be formed using the method 1000. In step 1001 high aspect ratio carbon elements 201 and a surface treatment material (e.g., a surfactant or polymer material as described herein) are combined with a solvent (of the type described herein) to form an initial slurry.

In step 1002 the initial slurry is processed to ensure good dispersion of the solid materials in the slurry. In some embodiments, this processing includes introducing mechanical energy into the mixture of solvent and solid materials (e.g., using a sonicator, which may be sometimes also be referred to as a "sonifier") or other suitable mixing device (e.g., a high shear mixer). In some embodiments, the mechanical energy introduced into the mixture is at least 0.4 kilowatt-hours per kilogram (kWh/kg), 0.5 kWh/kg, 0.6 kWh/kg, 0.7 kWh/kg, 0.8 kWh/kg, 0.9 kWh/kg, 1.0 kWh/kg, or more. For example, the mechanical energy introduced into the mixture per kilogram of mixture may be in the range of 0.4 kWh/kg to 1.0 kWh/kg or any subrange thereof such as 0.4 kWh/kg to 0.6 kWh/kg.

In some embodiments an ultrasonic bath mixer may be used. In other embodiments, a probe sonicator may be used. Probe sonication may be significantly more powerful and effective when compared to ultrasonic baths for nanoparticle applications. High shear forces created by ultrasonic cavitation have the ability to break up particle agglomerates and result in smaller and more uniform particles sizes. Among other things, sonication can result in stable and homogenous suspensions of the solids in the slurry. Generally, this results in dispersing and deagglomerating and other breakdown of the solids. Examples of probe sonication devices include the Q Series Probe Sonicators available from QSonica LLC of Newtown, Conn. Another example includes the Branson Digital SFX-450 sonicator available commercially from Thomas Scientific of Swedesboro, N.J.

In some embodiments, however, the localized nature of each probe within the probe assembly can result in uneven mixing and suspension. Such may be the case, for example, with large samples. This may be countered by use of a setup with a continuous flow cell and proper mixing. That is, with such a setup, mixing of the slurry will achieve reasonably uniform dispersion.

In some embodiments the initial slurry, once processed will have a viscosity in the range of 5,000 cps to 25,000 cps or any subrange thereof, e.g., 6,000 cps to 19,000 cps.

In step 1003, the surface treatment 202 may be fully or partially formed on the high aspect ratio carbon elements 201 in the initial slurry. In some embodiments, at this stage the surface treatment 202 may self-assemble as described in detail above with reference to FIGS. 2 and 3. The resulting surface treatment 201 may include functional groups or other features which, as described in further steps below, may promote adhesion between the high aspect ratio carbon elements 201 and active material particles 300.

In step 1004 the active material particles 300 may be combined with the initial slurry to form a final slurry containing the active material particles 300 along with the high aspect ratio carbon elements 201 with the surface treatment 202 formed thereon.

In some embodiments, the active material 300 may be added directly to the initial slurry. In other embodiments, the active material 300 may first be dispersed in a solvent (e.g., using the techniques described above with respect to the initial solvent) to form an active material slurry. This active material slurry may then be combined with the initial slurry to form the final slurry.

In step 1005 the final slurry is processed to ensure good dispersion of the solid materials in the final slurry. In various embodiments any suitable mixing process known in the art may be used. In some embodiments this processing may use the techniques described above with reference to step 1002. In some embodiments, a planetary mixer such as a multi-axis (e.g., three or more axis) planetary mixer may be used. In some such embodiments the planetary mixer can feature multiple blades, e.g., two or more mixing blades and one or more (e.g., two, three, or more) dispersion blades such as disk dispersion blades.

In some embodiments, during this step 1005, the matrix 200 enmeshing the active material 300 may fully or partially self-assemble, as described in detail above with reference to FIGS. 2 and 3. In some embodiments, interactions between the surface treatment 202 and the active material 300 promote the self-assembly process.

In some embodiments the final slurry, once processed will have a viscosity in the range of 1,000 cps to 10,000 cps or any subrange thereof, e.g., 2,500 cps to 6000 cps In step 1006, the active layer 100 is formed from the final slurry. In some embodiments, final slurry may be cast wet directly onto the current collector conductive layer 101 (or optional adhesion layer 102) and dried. As an example, casting may be by applying at least one of heat and a vacuum until substantially all of the solvent and any other liquids have been removed, thereby forming the active layer 100. In some such embodiments it may be desirable to protect various parts of the underlying layers. For example, it may desirable to protect an underside of the conductive layer 101 where the electrode 10 is intended for two-sided operation. Protection may include, for example, protection from the solvent by masking certain areas, or providing a drain to direct the solvent away.

In other embodiments, the final slurry may be at least partially dried elsewhere and then transferred onto the adhesion layer 102 or the conductive layer 101 to form the active layer 100, using any suitable technique (e.g., roll-to-roll layer application). In some embodiments the wet combined slurry may be placed onto an intermediate material with an appropriate surface and dried to form the layer (i.e., the active layer 100). While any material with an appropriate surface may be used as the intermediate material, exemplary intermediate material includes PTFE as subsequent removal from the surface is facilitated by the properties thereof. In some embodiments, the designated layer is formed in a press to provide a layer that exhibits a desired thickness, area and density.

In some embodiments, the final slurry may be formed into a sheet, and coated onto the adhesion layer 102 or the conductive layer 101 as appropriate. For example, in some embodiments, the final slurry may be applied to through a slot die to control the thickness of the applied layer. In other embodiments, the slurry may be applied and then leveled to a desired thickness, e.g., using a doctor blade. A variety of other techniques may be used for applying the slurry. For example, coating techniques may include, without limitation: comma coating; comma reverse coating; doctor blade coating; slot die coating; direct gravure coating; air doctor coating (air knife); chamber doctor coating; off set gravure coating; one roll kiss coating; reverse kiss coating with a small diameter gravure roll; bar coating; three reverse roll coating (top feed); three reverse roll coating (fountain die); reverse roll coating and others.

The viscosity of the final slurry may vary depending on the application technique. For example, for comma coating, the viscosity may range between about 1,000 cps to about 200,000 cps. Lip-die coating provides for coating with slurry that exhibits a viscosity of between about 500 cps to about 300,000 cps. Reverse-kiss coating provides for coating with slurry that exhibits a viscosity of between about 5 cps and 1,000 cps. In some applications, a respective layer may be formed by multiple passes.

In some embodiments, the active layer 100 formed from the final slurry may be compressed (e.g., using a calendaring apparatus) before or after being applied to the electrode 10. In some embodiments, the slurry may be partially or completely dried (e.g., by applying heat, vacuum or a combination thereof) prior to or during the compression process. For example, in some embodiments, the active layer may be compressed to a final thickness (e.g., in the direction normal to the current collector layer 101) of less than 90%, 80%, 70%, 50%, 40%, 30%, 20%, 10% or less of its pre-compression thickness.

In various embodiments, when a partially dried layer is formed during a coating or compression process, the layer may be subsequently fully dried, (e.g., by applying heat, vacuum or a combination thereof). In some embodiments, substantially all of the solvent is removed from the active layer 100.

In some embodiments, solvents used in formation of the slurries are recovered and recycled into the slurry-making process.

In some embodiments, the active layer may be compressed, e.g., to break some of the constituent high aspect ratio carbon elements or other carbonaceous material to increase the surface area of the respective layer. In some embodiments, this compression treatment may increase one or more of adhesion between the layers, ion transport rate within the layers, and the surface area of the layers. In various embodiments, compression can be applied before or after the respective layer is applied to or formed on the electrode 10.

In some embodiments where calendaring is used to compress the active layer 100, the calendaring apparatus may be set with a gap spacing equal to less than 90%, 80%, 70%, 50%, 40%, 30%, 20%, 10% or less of the layer's pre-compression thickness (e.g., set to about 33% of the layer's pre-compression thickness). The calendar rolls can be configured to provide suitable pressure, e.g., greater than 1 ton per cm of roll length, greater than 1.5 ton per cm of roll length, greater than 2.0 ton per cm of roll length, greater than 2.5 ton per cm of roll length, or more. In some embodiments, the post compression active layer will have a density in the range of 1 g/cc to 10 g/cc, or any subrange thereof such as 2.5 g/cc to 4.0 g/cc. In some embodiments the calendaring process may be carried out at a temperature in the range of 20° C. to 140° C. or any subrange thereof. In some embodiments the active layer may be pre-heated prior to calendaring, e.g., at a temperature in the range of 20° C. to 100° C. or any subrange thereof.

Once the electrode 10 has been assembled, the electrode 100 may be used to assemble the energy storage device 10. Assembly of the energy storage device 10 may follow conventional steps used for assembling electrodes with separators and placement within a housing such as a canister or pouch, and further may include additional steps for electrolyte addition and sealing of the housing.

In various embodiments, process 1000 may include any of the following features (individually or in any suitable combination)

In some embodiments, the initial slurry has a solid content in the range of 0.1%-20.0% (or any subrange thereof) by weight. In some embodiments, the final slurry has a solid content in the range of 10.0%-80% (or any subrange thereof) by weight.

In various embodiments, the solvent used may any of those described herein with respect to the formation of the surface treatment 202. In some embodiments, the surfactant material used to form the surface treatment 202 may be soluble in a solvent which exhibits advantageous properties. For example, in some embodiments, the solvent may include water or an alcohol such as methanol, ethanol, or 2-propanol (isopropyl alcohol, sometimes referred to as IPA) or combinations thereof. In some embodiments, the solvent may include one or more additives used to further improve the properties of the solvent, e.g., low boiling point additives such as acetonitrile (ACN), de-ionized water, and tetrahydrofuran.

In some embodiments, if a low boiling point solvent is used the solvent may be quickly removed using a thermal drying process performed at a relatively low temperature. As will be understood by those skilled in the art, this can improve the speed and or cost of manufacture of the electrode 10. For example, in some embodiments, the solvent may have a boiling point less than 250° C., 225° C., 202° C., 200° C., 185° C., 180° C., 175° C., 150° C., 125° C., or less, e.g., less than or equal to 100° C.

In some embodiments, the solvent may exhibit other advantageous properties. In some embodiments the solvent may have a low viscosity, such a viscosity at 20° C. of less than or equal to 3.0 centipoise, 2.5 centipoise, 2.0 centipoise, 1.5 centipoise, or less. In some embodiments the solvent may have a low surface tension such a surface tension at 20° C. of less than or equal to 40 mN/m, 35 mN/m, 30 mN/m, 25 mN/m or less. In some embodiments the solvent may have a low toxicity, e.g., toxicity comparable to alcohols such as isopropyl alcohol.

In some embodiments, during the formation of the active layer, a material forming the surface treatment may be dissolved in a solvent substantially free of pyrrolidone compounds. In some embodiments, the solvent is substantially free of n-methyl-2-pyrrolidone.

In some embodiments, the surface treatment 201 is formed from a material that includes a surfactant of the type described herein.

In some embodiments, dispersing high aspect ratio carbon elements and a surface treatment material in a solvent to form an initial slurry comprises applying forces to agglomerated carbon elements to cause the elements to slide apart from each other along a direction transverse to a minor axis of the elements. In some embodiments, techniques for forming such dispersions may be adapted from those disclosed in International Patent Publication No. WO/2018/102652 published Jun. 7, 2018 in further view of the teachings described herein.

In some embodiments, the high aspect ratio carbon elements 201 can be functionalized prior to forming a slurry used to form the electrode 10. For example, in one aspect a method is disclosed that includes dispersing high aspect ratio carbon elements 201 and a surface treatment material in an aqueous solvent to form an initial slurry, wherein said dispersion step results in the formation of a surface treatment on the high aspect ratio carbon; drying the initial slurry to remove substantially all moisture resulting in a dried powder of the high aspect ratio carbon with the surface treatment thereon. In some embodiments, the dried powder may be combined, e.g., with a slurry of solvent and active material to form a final solvent of the type described above with reference to method 1000.

In some embodiments, drying the initial slurry comprises lyophilizing (freeze-drying) the initial slurry. In some embodiments, the aqueous solvent and initial slurry are substantially free of substances damaging to the high aspect ratio carbon elements. In some embodiments, the aqueous solvent and initial slurry are substantially free of acids. In some embodiments, the initial slurry consists essentially of the high aspect ratio carbon elements, the surface treatment material, and water.

Some embodiments further include dispersing the dried powder of the high aspect ratio carbon with the surface treatment in a solvent and adding and active material to form a secondary slurry; coating the secondary slurry onto a substrate; and drying the secondary slurry to form an electrode active layer. In some embodiments, the preceding steps can be performed using techniques adapted from those disclosed in International Patent Publication No. WO/2018/102652 published Jun. 7, 2018 in further view of the teachings described herein.

In some embodiments, the final slurry may include polymer additives such as polyacrilic acid (PAA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP). In some embodiments, the active layer may be treated by applying heat to pyrolyze the additive such that the surface treatment 202 may be formed a layer of carbonaceous material which results from the pyrolization of the polymeric additive. This layer of carbonaceous material (e.g., graphitic or amorphous carbon) may attach (e.g., via covalent bonds) to or otherwise promote adhesion with the active material particles 300. The heat treatment may be applied by any suitable means, e.g., by application of a laser beam. Examples of suitable pyrolization techniques are described in U.S. Patent Application Ser. No. 63/028,982 filed May 22, 2020.

Surfactants

The techniques described above include the use of surfactants to for a surface treatment 202 on high aspect ratio carbon nanotubes 201 in order to promote adhesion with the active material particles 300. While several advantageously suitable surfactants have been described, it is to be understood that other surfactant material may be used, including the following.

Surfactants are molecules or groups of molecules having surface activity, including wetting agents, dispersants, emulsifiers, detergents, and foaming agents. A variety of surfactants can be used in preparation surface treatments as described herein. Typically, the surfactants used contain a lipophilic nonpolar hydrocarbon group and a polar functional hydrophilic group. The polar functional group can be a carboxylate, ester, amine, amide, imide, hydroxyl, ether, nitrile, phosphate, sulfate, or sulfonate. The surfactants can be used alone or in combination. Accordingly, a combination of surfactants can include anionic, cationic, nonionic, zwitterionic, amphoteric, and ampholytic surfactants, so long as there is a net positive or negative charge in the head regions of the population of surfactant molecules. In some instances, a single negatively charged or positively charged surfactant is used in the preparation of the present electrode compositions.

A surfactant used in preparation of the present electrode compositions can be anionic, including, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium oleate, sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate (SDS), sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, for example, 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec Inc., West Paterson, N.J.), NaSul CA-HT3 (King Industries, Norwalk, Conn.), and C500 (Crompton Co., West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

Alkyl or alkyl groups refers to saturated hydrocarbons having one or more carbon atoms, including straight-chain alkyl groups (for example, methyl, ethyl, propyl, butyl, pentyl, hexyl, heptyl, octyl, nonyl, decyl, and so on), cyclic alkyl groups (or cycloalkyl or alicyclic or carbocyclic groups) (for example, cyclopropyl, cyclopentyl, cyclohexyl, cycloheptyl, cyclooctyl, and so on), branched-chain alkyl groups (for example, isopropyl, tert-butyl, sec-butyl, isobutyl, and so on), and alkyl-substituted alkyl groups (for example, alkyl-substituted cycloalkyl groups and cycloalkyl-substituted alkyl groups).

Alkyl can include both unsubstituted alkyls and substituted alkyls. Substituted alkyls refers to alkyl groups having substituents replacing one or more hydrogens on one or more carbons of the hydrocarbon backbone. Such substituents can include, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkyl aminocarbonyl, dialkylaminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl or aromatic (including heteroaromatic) groups.

In some embodiments, substituted alkyls can include a heterocyclic group. Heterocyclic groups include closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran and furan.

For an anionic surfactant, the counter ion is typically sodium but can alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations can also be used.

A surfactant used in preparation of the present materials can be cationic. Such cationic surfactants include, but are not limited to, pyridinium-containing compounds, and primary, secondary tertiary or quaternary organic amines. For a cationic surfactant, the counter ion can be, for example, chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine and tallow alkyl amine, as well as mixtures thereof.

Examples of quaternary amines with a single long alkyl group are cetyltrimethyl ammonium bromide (CTAB), benzyldodecyldimethylammonium bromide (BddaBr), benzyldimethylhexadecylammonium chloride (BdhaCl), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are didodecyldimethylammonium bromide (DDAB), distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bis-stearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, amprolium hydrochloride (AH), and benzethonium hydrochloride (BH) can also be used.

A surfactant used in preparation of the present materials can be nonionic, including, but not limited to, polyalkylene oxide carboxylic acid esters, fatty acid esters, fatty alcohols, ethoxylated fatty alcohols, poloxamers, alkanolamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. An ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (for example, alkyl polyglycosides) contain a hydrophobic group with about 6 to about 30 carbons and a polysaccharide (for example, polyglycoside) as the hydrophilic group. An example of commercial nonionic surfactant is FOA-5 (Octel Starreon LLC., Littleton, Colo.).

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

A surfactant used in preparation of the present materials can be zwitterionic, having both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety can contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

A surfactant used in preparation of the present materials can be amphoteric. Examples of suitable amphoteric surfactants include ammonium or substituted ammonium salts of alkyl amphocarboxy glycinates and alkyl amphocarboxy-propionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

A surfactant used in preparation of the present materials can also be a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, polystearamides, and polyethylenimine.

A surfactant used in preparation of the present materials can also be a polysorbate type nonionic surfactant such as polyoxyethylene (20) sorbitan monolaurate (Polysorbate 20), polyoxyethylene (20) sorbitan monopalmitate (Polysorbate 40), polyoxyethylene (20) sorbitan monostearate (Polysorbate 60) or polyoxyethylene (20) sorbitan monooleate (Polysorbate 80).

A surfactant used in preparation of the present materials can be an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

The surfactant used in preparation of the present materials can be a combination of two or more surfactants of the same or different types selected from the group consisting of anionic, cationic, nonionic, zwitterionic, amphoteric and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Thin Polymeric Layer Materials

The techniques described above include the use of polymers to form a surface treatment 201 on high aspect ratio carbon nanotubes in order to promote adhesion with the active material particles 300. While several advantageously suitable polymers have been described, it is to be understood that other polymer material may be used, including the following.

The polymer used in preparation of the present materials can be polymer material such a water processable polymer material. In various embodiments any of the follow polymers (and combinations thereof) may be used: polyacrilic acid (PAA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP). In some embodiments. Another exemplary polymer material is fluorine acrylic hybrid Latex (TRD202A), and is supplied by JSR Corporation.

EXAMPLES

The following non-limiting examples further describe the application of the teachings of this disclosure. In the following examples, the term "binder free" or "binderless" electrodes reference to electrodes of the type described in detail above featuring a 3D matrix or scaffold of high aspect ratio carbons which a surface treatment thereon which promotes adhesion of active material to the scaffold without the need for bulk polymeric binders such as PVDF.

As used in the following the term C-rate refers to a measure of the rate at which a battery is discharged relative to its maximum capacity. A 1C rate means that the discharge current will discharge the entire battery in 1 hour. For a battery with a capacity of 100 Amp-hrs, this equates to a discharge current of 100 Amps.

Example 1—Electric Vehicle Battery Cell

The following battery cell suitable for use in Electric Vehicles ("EV"). This cell combines cathode and anode technology of the type described herein for use, e.g., in an EV application. Key high-level benefits include lower cost to manufacture, higher energy density, excellent power density, and wide temperature range operation. These benefits are derived from the herein described approach to manufacturing battery electrodes, which eliminates the use of PVDF polymer binders and toxic solvents like N-Methyl-2-pyrrolidone (NMP). The result is a substantial performance advantage in range, charging speed, and acceleration for the end-user with a manufacturing process that is lower cost, less capital intensive and safer for the battery producers.

The teachings herein provide a technology platform to manufacture electrodes for energy storage which may exhibit the following advantages: reduction in cost of manufacturing and in the $/kWh of resulting LIBs, increase in energy density by combining cathodes with thick coatings and high capacity anodes featuring high performance active materials such as Si or SiOx, fast charging. The teachings herein provide a scalable technology to improve power density in energy storage, by removing conventional polymer binders from the active material coatings.

Conventional electrodes for LiBs are fabricated by mixing an active material, conductive additives and a polymer binder in a slurry. Conventional cathodes are manufactured using NMP-based slurries and PVDF polymer binders. Those binders have very high molecular weight and promote cohesion of active material particles and adhesion to the current collector foil via two main mechanisms: 1) the entanglement promoted by long polymer chains, and 2) hydrogen bonds between the polymer, the active material, and the current collector. However, the polymer binder-based method presents significant drawbacks in performance: power density, energy density, and also cost to manufacture.

The teachings herein provide electrodes that do not have PVDF binders in cathodes, or other conventional binders in anodes. Instead, as detailed above a 3D carbon scaffold or matrix holds active material particles together to form a cohesive layer that is also strongly attached to the metallic current collector. Such active material structure is created during slurry preparation and subsequently in a roll to roll ("R2R") coating and drying process. One of the main advantages of this technology is its scalability and "drop-in" nature since it compatible with conventional electrode manufacturing processes.

The 3D carbon matrix is formed during a slurry preparation using the techniques described herein: high aspect ratio carbon materials are properly dispersed and chemically functionalized using, e.g., a 2-step slurry preparation process (such as the type described above with reference to FIG. 6). The chemical functionalization is designed to form an organized self-assembled structure with the surface of active material particles, e.g. NMC particles for use in a cathode or silicon particles ("Si") or Silicon Oxide ("SiOx") particles in the case of an anode. The so formed slurry may be based on alcohol solvents for cathodes and water for anodes, and such solvents are very easily evaporated and handled during the manufacturing process. Electrostatic interactions promote the self-organized structure in the slurry, and after the drying process the bonding between the so formed carbon matrix with active material particles and the surface of the current collector is promoted by the surface treatment (e.g., functional groups on the matrix) as well as the strong entanglement of the active material in the carbon matrix.

As will be understood by one skilled in the art, the mechanical properties of the electrodes can be readily modified depending on the application, and the mass loading requirements by tuning the surface functionalization vs. entanglement effect.

After coating and drying, the electrodes undergo a calendaring step to control the density and porosity of the active material. In NMC cathode electrodes, densities of 3.5 g/cc or more and 20% porosity or more can be achieved. Depending on mass loading and LIB cell requirements the porosity can be optimized. As for SiOx/Si anodes, the porosity is specifically controlled to accommodate active material expansion during the lithiation process.

In some typical applications, the teachings herein may provide a reduction in $/kWh of up to 20%. By using friendly solvents that are easily evaporated, the electrode throughput is higher, and more importantly, the energy consumption from the long driers is significantly reduced. The conventional NMP recovery systems are also much simplified when alcohol or other solvent mixtures are used.

The teachings herein provide a 3D matrix that dramatically boosts electrode conductivity by a factor of 10× to 100× compared to electrodes using conventional binders such as PVDF, which enables fast charging at a battery level. Thick electrode coatings in cathode up to 150 um per side (or more) of current collector are possible with this technology. The solvents used in the slurry in combination with a strong 3D carbon matrix are designed to achieve thick wet coatings without cracking during the drying step. Thick cathodes with high capacity anodes are what enable a substantial jump in energy density reaching 400 Wh/kg or more.

Fast charging is achieved by combining high capacity anodes that are lithiated through an alloying process (Si/SiOx) and by reducing the overall impedance of the cell when combining anodes and cathodes as described herein. The teachings herein provide fast charging by having highly conductive electrodes, and in particular highly conductive cathode electrodes.

One exemplary embodiments includes a Li-ion battery energy storage devices in a pouch cell format that combines Ni-rich NMC active material in the cathodes and SiOx and graphite blend active material in the anodes, where both anodes and cathodes are made using a 3D carbon matrix process as described herein.

Figures 7, 8:
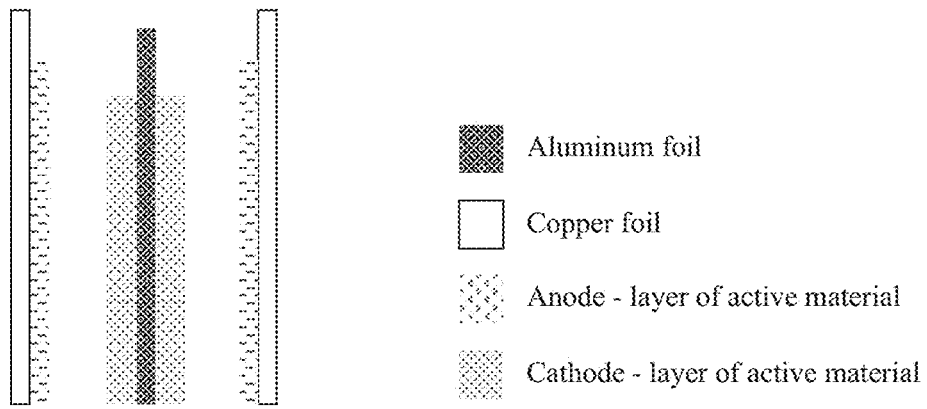
FIG. 7 shows a schematic of a pouch cell battery
FIG. 8 shows a summary of functional parameters for a pouch cell battery for EV applications.

A schematic of the electrode arrangement pouch cell devices is shown in FIG. 7. As shown, a double-sided cathode using polymer binder free cathode layers on opposing sides of an aluminum foil current collector are disposed between two single sided anodes each having a polymer binder free anode layer disposed on a copper foil current collector. The electrodes are be separated by permeable separator material (not shown) wetted with electrolyte (not shown). The arrangement can be housed in a pouch cell of the type well known in the art.

These devices may feature high mass loading of Ni-rich NMC cathode electrodes and their manufacturing method: mass loading=20-30 mg/cm', specific capacity>210 mAh/g. SiOx/Graphite anode (SiOx content=~20 wt. %) based electrodes and their material synthesis and manufacturing method: mass loading 8-14 mg/cm$^2$, reversible specific capacity≥550 mAh/g. Long life performance specially for SiOx/Graphite anode based Li-ion based electrolyte for battery: from −30 to 60° C. High-energy, high-power density, and long cycle life Ni-rich NMC cathode/SiOx+Graphite/Carbon+based Li-ion battery pouch cells: capacity≥5 Ah, Specific Energy≥300 Wh/kg, Energy Density≥800 Wh/L, with a cycle life of more than 500 cycles under 1C-Rate charge-discharge, and ultra-high-power fast charge-discharge C-Rate (Up to 5C-Rate) capabilities. A summary of performance parameters for a pouch cell of this type are summarized in FIG. 8.

Example 2—Comparative Performance NMC811 Lithium Ion Battery

As detailed above, the teachings herein provide electrodes configured with an advanced 3-D high aspect ratio carbon binding structure that eliminates the need for polymer binders, providing greater power, energy density (e.g., via thicker electrodes and higher mass loading of active material), and performance in extreme environments compared to traditional battery electrode designs. The high-performance Li-ion battery energy storage devices are designed and manufactured with an optimized capacity ratio design of binder-free cathode/anode electrodes, anode electrode pre-lithiation, and wide operating temperature electrolyte (e.g., −30 to 60° C.), and optimized test formation processes.

As described herein, the electrodes are manufactured by completely removing high molecular weight polymers such as PVDF and the toxic NMP solvent from the active material layer. This dramatically improves LiB performance while decreasing the cost of manufacturing and the capital expenditures related to mixing, coating and drying, NMP solvent recovery, and calendaring. In embodiments of the electrodes, a 3D nanoscopic carbon matrix works as a mechanical scaffold for the electrode active material and mimics the polymer chain entanglement. Chemical bonds are also present between the surface of the carbon, the active materials, and the current collector promoting adhesion and cohesion. As opposed to polymers, however, the 3D nanoscopic carbon matrix is very electrically conductive, which enables very high power (high C-rates). This scaffold structure is also more suitable for producing thick electrode active material, which is a powerful way to increase the energy density of LiB cells.

In the present example, a binder free cathode was produced according to the teachings of this disclosure featuring a NMC811 as an active material and incorporated in a Li-ion battery (LIB). The cell featured a graphite anode of the conventional type known in the art. The cell was constructed as described above with reference to FIG. 7 using the parameters summarized in FIG. 9. A conventional electrolyte was used composed of 1M of LiPF6 in an solvent mixture of ethylene carbonate and dimethyl carbonate with 1% by weight vinyl carbonate additive. As a comparison, an otherwise identical cell was produced using a PVDF binder based cathode. The performance of the cells was compared as described below, showing clear advantages for the binder free cathode cell.

As shown in the results summarized in FIG. 10, the binder free cell can reach a specific energy as high as 320 Wh/kg based on 20 Ah battery cell design and a graphite anode with more than 2,000 cycle cycle life under 2C-rate charge/discharge. In comparison, the conventional binder-based cathode cell can only achieve 100-250 Wh/kg in specific energy at the cell level.

The binder free cathode cell exhibits ultra-high-power fast charge-discharge C-Rate, up to 5C-Rate with >50% capacity retention. FIG. 10 shows a comparison of the charge-discharge curves at various C-rates for the binder free cathode cell (left) and the conventional binder-based cathode cell (right). The binder free cathode cell charge-discharge curve shows over 60% capacity retention of a combined charge-discharge at a 5C rate. Accordingly, separate discharge or charge would exhibit even higher capacity retention. Note in the example provided a conventional graphite anode is used, initial experimental results show that when a Si-dominant anode is combined with NMC811 cathode used in the present example, 10C charge rate is achievable.

Figure 11:
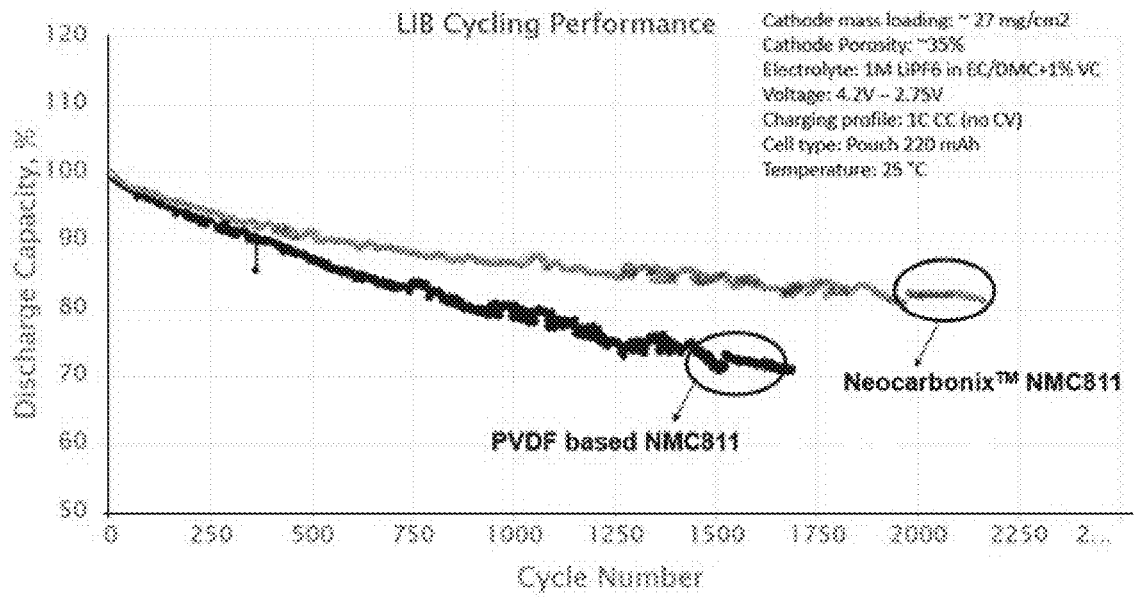
FIG. 11 shows the results of a comparative performance evaluation of a pouch cell battery featuring a binder free cathode (upper trace) and a pouch cell battery featuring a binder based cathode (lower trace).

FIG. 11 shows a comparison of the cycle life of the above described cells. The cells were repetitively cycled between voltages of 2.75V and 4.2V at 25° C., and the discharge capacity recorded. The binder free cathode cell exhibits a lifetime of greater than 2,000 cycles with discharge capacity loss of less than 20%. In contrast the binder-based cathode cell experiences greater than 20% discharge capacity loss after only about 1,000 cycles.

Example 3—Pouch Half Cell Comparison

Binder free cathode electrodes of the type described herein can advantageously achieve high mass loadings for example, a mass loading of 45 mg/cm$^2$ per side of NMC811 active material is possible. The present example sets forth experimental results showing the performance of such a high mass loading binder free electrode in comparison with a control electrode featuring PVDF binder and an NMC811 active material.

Figure 12:
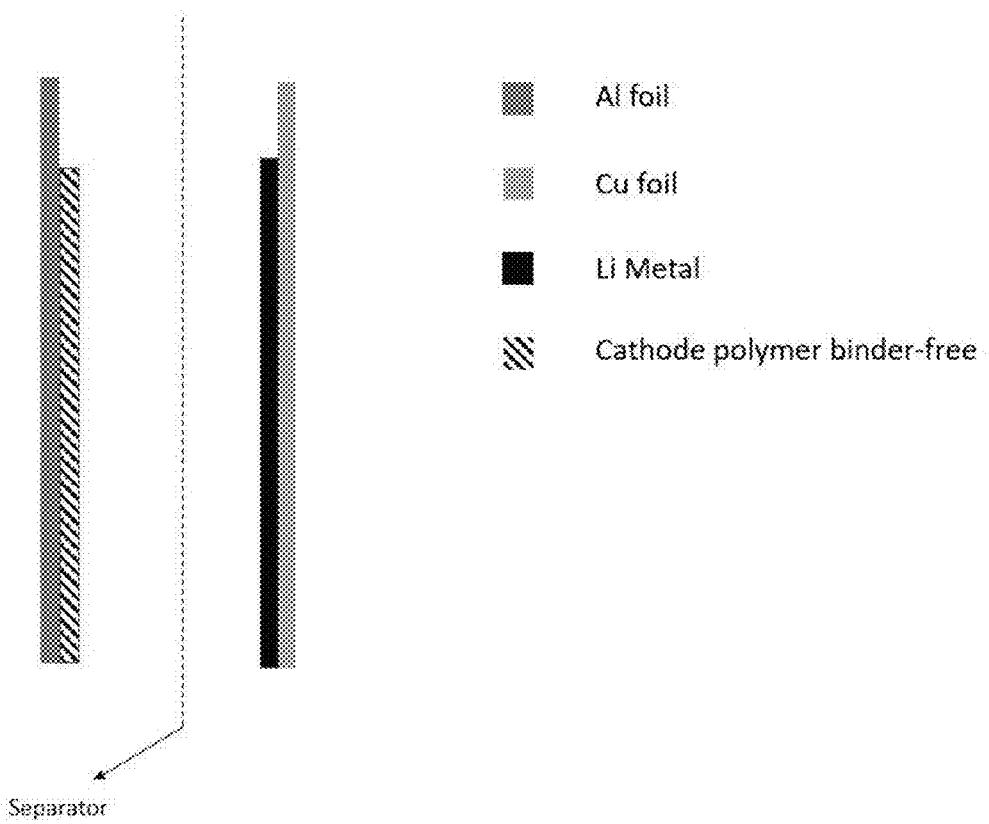
FIG. 12 is a schematic of a half cell lithium battery apparatus.

To perform the comparison, half-cells of the type shown in FIG. 12 were constructed using a one sided cathode (either binder free or the binder based control) and a lithium foil on copper substrate as the counter electrode for the cell. The half cells underwent charge rate testing under various current densities and the results summarized below.

Figure 13:
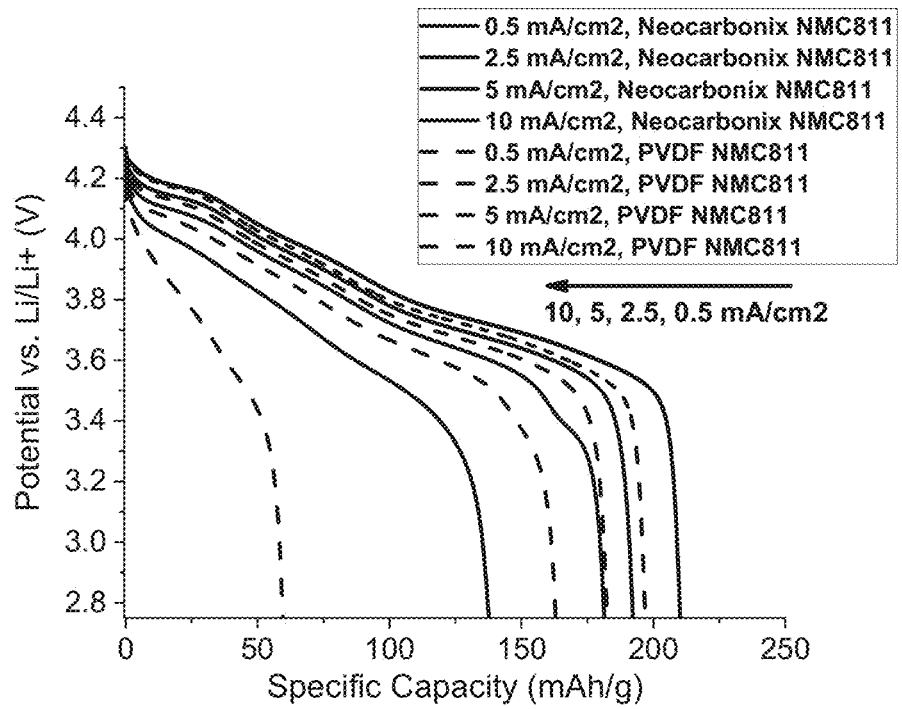
FIG. 13 is a plot showing potential (referenced to the Li/Li+ potential) vs specific capacity for binder free cathode half cell (solid traces) and reference binder based cathode half cell (dashed traces) at various current densities

FIG. 13 is a plot showing potential (referenced to the Li/Li+ potential) vs specific capacity for binder free cathode half cell (solid traces) and reference binder based cathode half cell (dashed traces) at various current densities. At all current densities (and thus all C-rates), the binder free cathode half cells show better performance (as indicated by the relative rightward shift of the trace).

Figure 14:
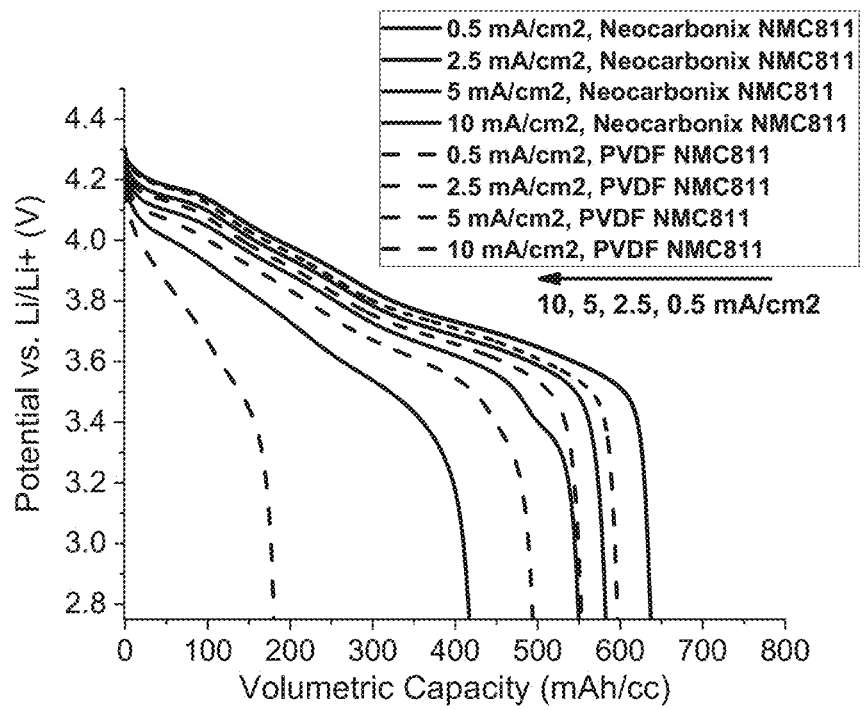
FIG. 14 is a plot showing potential (referenced to the Li/Li+ potential) vs volumetric capacity for binder free cathode have cell (solid traces) and reference binder based cathode half cell (dashed traces) at various current densities

FIG. 14 is a plot showing potential (referenced to the Li/Li+ potential) vs volumetric capacity for binder free cathode have cell (solid traces) and reference binder based cathode half cell (dashed traces) at various current densities. At all current densities (and thus all C-rates), the binder free cathode half cells show better performance (as indicated by the relative rightward shift of the trace).

Figure 15:
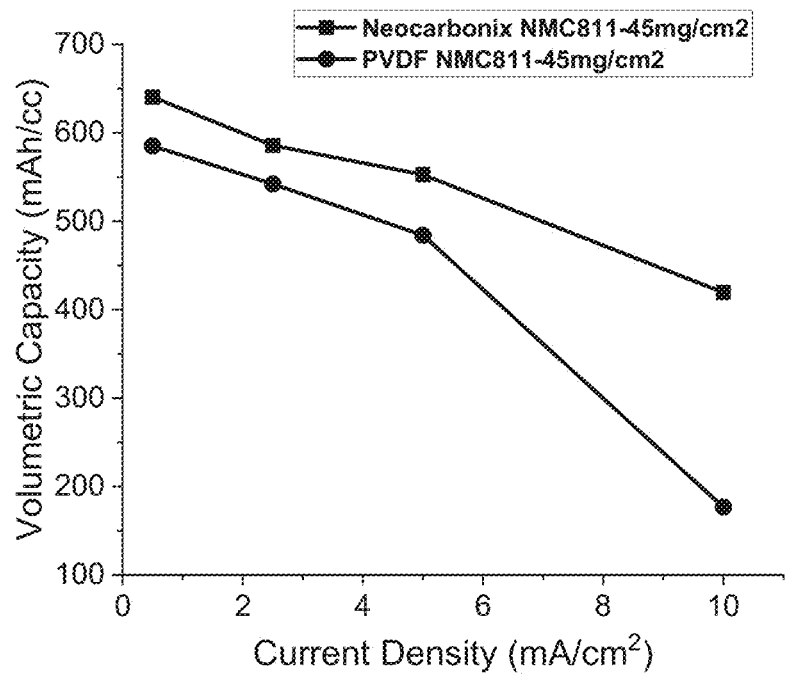
FIG. 15 shows a plot of volumetric capacity vs current density for binder free cathode half cells (upper trace) and reference binder based cathode half cell (lower trace).

FIG. 15 shows a plot of volumetric capacity vs current density for binder free cathode half cells (upper trace) and reference binder based cathode half cell (lower trace). At all current densities (and thus all C-rates), the binder free cathode half cells show better performance, with the relative performance gap widening at higher C-rates.

Figure 16:
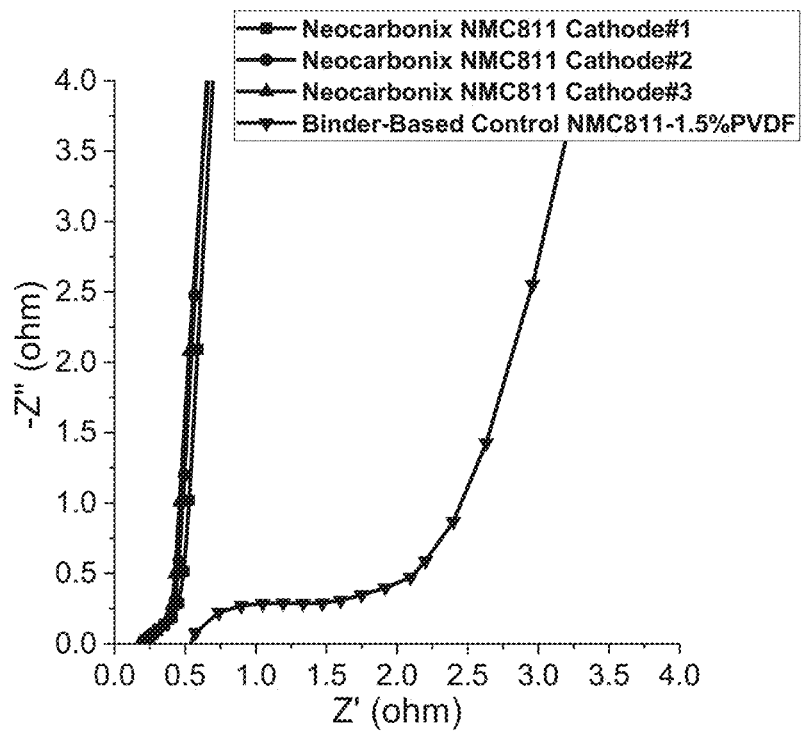
FIG. 16 shows a Nyquist plot resulting from electrochemical impedance spectroscopy for several binder free cathode half cells (square, circle and triangle labeled traces) and a reference binder based cathode half cells. The binder free cathode half cells exhibit significantly better performance than the reference cell.

FIG. 16 shows a Nyquist plot resulting from electro-chemical impedance spectroscopy for several binder free cathode half cells (square, circle and triangle labeled traces) and a reference binder based cathode half cells. The binder free cathode half cells exhibit significantly better performance than the reference cell.

It can be seen from the FIG.s that when the current density increases from 0.5 to 10 mA/cm$^2$ (1.2 C-Rate), the discharge capacity retention for binder-free NMC811 electrode has a much higher value compared with a binder based PVDF control NMC811 electrode, even though both electrodes have the same mass loading of 45 mg/cm$^2$. Note that this C-Rate test under various current densities is presented as a relative comparison between conventional binder based PVDF cathodes and binder free cathodes, and does not reflect the absolute C-rate performance in a full cell configuration, e.g., as presented in the Examples 1 and 2 above.

CONCLUSION

Any terms of orientation provided herein are merely for purposes of introduction and are not limiting of the invention. For example, a "top" layer may also be referred to as a second layer, the "bottom" layer may also be referred to as a first layer. Other nomenclature and arrangements may be used without limitation of the teachings herein.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party. Similarly, acceptability of performance is to be assessed by the appropriate user, designer, manufacturer or other similarly interested party.

While some chemicals may be listed herein as providing a certain function, a given chemical may be useful for another purpose.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

The entire contents of each of the publications and patent applications mentioned above are incorporate herein by reference. In the event that the any of the cited documents conflicts with the present disclosure, the present disclosure shall control.

Note that it is not intended that any functional language used in claims appended herein be construed as invoking 35 U.S.C. § 112(f) interpretations as "means-plus-function" language unless specifically expressed as such by use of the words "means for" or "steps for" within the respective claim.

While the invention has been described with reference to exemplary embodiments, it will be understood that various changes may be made and equivalents may be substituted for elements thereof without departing from the scope of the invention. For example, in some embodiments, one of the foregoing layers may include a plurality of layers there within. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An energy storage cell comprising:
 a first electrode;
 a second electrode;
 a permeable separator disposed between the first electrode and the second electrode; and an electrolyte wetting the first and second electrodes; wherein at least one of the first electrode or the second electrode comprises:
 a current collector; upon which is disposed an electrode active layer; the electrode active layer comprising:
  a network of high aspect ratio carbon elements defining void spaces within the network; wherein the network of high aspect ratio carbon elements include elongated rod or fiber shaped elements having one major dimension and two minor dimensions and wherein the ratio of the length of the major dimension is at least 5 times or more of that of each of the minor dimensions;
  a plurality of electrode active material particles disposed in the void spaces within the network and enmeshed in the network; and
  a surface treatment on a surface of the high aspect ratio carbon elements which promotes adhesion between the high aspect ratio carbon elements and the active material particles; wherein the surface treatment material comprises a surfactant; and wherein the surfactant is an ionic surfactant compound that comprises at least one selected from the list consisting of hexadecyltrimethylammonium tetrafluoroborate, hexadecyltrimethylammonium tetrafluoroborate, cocamidopropyl betaine hexadecyltrimethylammonium acetate, and hexadecyltrimethylammonium nitrate.

2. The energy storage cell of claim 1, wherein the active material particles comprise lithium metal oxides.

3. The energy storage cell of claim 2, wherein the lithium metal oxides are lithium cobalt oxide, a lithium nickel manganese cobalt oxide, a lithium manganese oxide, a lithium nickel cobalt aluminum oxide a lithium titanate oxide, a lithium iron phosphate oxide, or a lithium nickel cobalt aluminum oxide.

4. The energy storage cell of claim 3, wherein the lithium cobalt oxide is $LiCoO_2$, the lithium nickel manganese cobalt oxide is LiNiMnCo; the lithium manganese oxide is $LiMn_2O_4$ or $Li_2MnO_3$, the lithium nickel cobalt aluminum oxide is $LiNiCoAlO_2$, the lithium titanate oxide is $Li_4Ti_5O_{12}$, and the lithium iron phosphate oxide is $LiFePO_4$.

5. The energy storage cell of claim 3, wherein the lithium nickel manganese cobalt oxide is $LiNi_xMn_yCo_{1-x-y}O_2$, where x is equal to or greater than 0.7 and wherein y is 0.1.

6. The energy storage cell of claim 3, wherein the lithium nickel manganese cobalt oxide is $LiNi_{0.33}Mn_{0.33}Co_{0.33}O_2$, $LiNi_{0.5}Mn_{0.3}Co_{0.2}O_2$, or $LiNi_{0.6}Mn_{0.2}Co_{0.2}O_2$.

7. The energy storage cell of claim 1, wherein the high aspect ratio carbon elements comprise at least one of carbon nanotubes and carbon nanotube bundles.

8. The energy storage cell of claim 1, wherein the network is at least ninety nine percent carbon by weight and exhibits electrical connectivity above a percolation threshold, wherein the network defines one or more highly electrically conductive pathways having a length greater than 100 µm.

9. The energy storage cell of claim 1, wherein the surfactant forms a surfactant layer that is bonded to the carbon elements and comprises a plurality of surfactant elements each having a hydrophobic end and a hydrophilic end, wherein the hydrophobic end is disposed proximal to a surface of the carbon elements and the hydrophilic end is disposed distal to said surface of the carbon elements.

10. The energy storage cell of claim 1, wherein the surfactant provides functional groups which promote adhesion of the active material particles to the network.

11. The energy storage cell of claim 1, wherein the surfactant comprises a hydrophilic end that has a polar charge of a first polarity and wherein the active material particle carries a polar charge of a second polarity opposite that of the first polarity.

12. The energy storage cell of claim 1, wherein the surfactant comprises ions formed from dissolving an ionic compound in a solvent.

13. The energy storage cell of claim 1, wherein the electrode active layer comprises residual counter ions to surfactant ions obtained from the surfactant; wherein the surfactant is an ionic surfactant and wherein the surfactant ions are formed by dissolving the ionic surfactant compound in a solvent.

14. An electrode comprising:
a current collector upon which is disposed an electrode active layer; wherein the electrode active layer comprises:
a network of high aspect ratio carbon elements defining void spaces within the network; wherein the network of high aspect ratio carbon elements include elongated rod or fiber shaped elements having one major dimension and two minor dimensions and wherein the ratio of the length of the major dimension is at least 5 times or more of that of each of the minor dimensions;
a plurality of electrode active material particles disposed in the void spaces within the network and enmeshed in the network; and
a surface treatment on a surface of the high aspect ratio carbon elements which promotes adhesion between the high aspect ratio carbon elements and the active material particles; wherein the surface treatment material comprises a surfactant; and wherein the surfactant is an ionic surfactant compound that comprises at least one selected from the list consisting of hexadecyltrimethylammonium tetrafluoroborate, hexadecyltrimethylammonium tetrafluoroborate, cocamidopropyl betaine hexadecyltrimethylammonium acetate, and hexadecyltrimethylammonium nitrate.

15. The energy storage cell of claim 14, wherein the active material particles comprise lithium metal oxides.

16. The energy storage cell of claim 15, wherein the lithium metal oxides are lithium cobalt oxide, a lithium nickel manganese cobalt oxide, a lithium manganese oxide, a lithium nickel cobalt aluminum oxide, a lithium titanate oxide, a lithium iron phosphate oxide, or a lithium nickel cobalt aluminum oxide.

17. The energy storage cell of claim 16, wherein the lithium cobalt oxide is $LiCoO_2$, the lithium nickel manganese cobalt oxide is $LiNiMnCoO_2$; the lithium manganese oxide is $LiMn_2O_4$ or $Li_2MnO_3$, the lithium nickel cobalt aluminum oxide is $LiNiCoAlO_2$, the lithium titanate oxide is $Li_4Ti_5O_{12}$, and the lithium iron phosphate oxide is $LiFePO_4$.

18. The energy storage cell of claim 16, wherein the lithium nickel manganese cobalt oxide is $LiNi_xMn_yCo_{1-x-y}O_2$, where x is equal to or greater than 0.7 and wherein y is 0.1.

19. The energy storage cell of claim 16, wherein the lithium nickel manganese cobalt oxide is $LiNi_{0.33}Mn_{0.33}Co_{0.33}O_2$, $LiNi_{0.5}Mn_{0.3}Co_{0.2}O_2$, or $LiNi_{0.6}Mn_{0.2}Co_{0.2}O_2$.

20. The energy storage cell of claim 14, wherein the high aspect ratio carbon elements comprise at least one of carbon nanotubes and carbon nanotube bundles.

21. The energy storage cell of claim 14, wherein the network is at least ninety nine percent carbon by weight and exhibits electrical connectivity above a percolation threshold, wherein the network defines one or more highly electrically conductive pathways having a length greater than 100 µm.

22. The energy storage cell of claim 14, wherein the surfactant forms a surfactant layer that is bonded to the carbon elements and comprises a plurality of surfactant elements each having a hydrophobic end and a hydrophilic end, wherein the hydrophobic end is disposed proximal to a surface of the carbon elements and the hydrophilic end is disposed distal to said surface of the carbon elements.

23. The energy storage cell of claim 14, wherein the surfactant provides functional groups which promote adhesion of the active material particles to the network.

24. The energy storage cell of claim 14, wherein the surfactant comprises a hydrophilic end that has a polar charge of a first polarity and wherein the active material particle carries a polar charge of a second polarity opposite that of the first polarity.

25. The energy storage cell of claim 14, wherein the surfactant comprises ions formed from dissolving an ionic compound in a solvent.

26. The energy storage cell of claim 14, wherein the electrode active layer comprises residual counter ions to surfactant ions obtained from the surfactant; wherein the surfactant is an ionic surfactant and wherein the surfactant ions are formed by dissolving the ionic surfactant compound in a solvent.

* * * * *